US008509987B2

(12) United States Patent
Resner

(10) Patent No.: US 8,509,987 B2
(45) Date of Patent: Aug. 13, 2013

(54) METHODS AND APPARATUS FOR AUTOMATIC INTERNET LOGGING AND SOCIAL COMPARISON OF VEHICULAR DRIVING BEHAVIOR

(76) Inventor: Benjamin Resner, Jamaica Plain, MA (US)

( * ) Notice: Subject to any disclaimer, the term of this patent is extended or adjusted under 35 U.S.C. 154(b) by 304 days.

(21) Appl. No.: 12/944,661

(22) Filed: Nov. 11, 2010

(65) Prior Publication Data

US 2011/0112717 A1 May 12, 2011

Related U.S. Application Data

(60) Provisional application No. 61/260,335, filed on Nov. 11, 2009, provisional application No. 61/348,534, filed on May 26, 2010, provisional application No. 61/363,974, filed on Jul. 13, 2010.

(51) Int. Cl.
*G01M 17/00* (2006.01)

(52) U.S. Cl.
USPC ......... 701/33.3; 701/32.5; 701/408; 701/425; 701/451; 701/453; 701/469; 340/438

(58) Field of Classification Search
USPC .............. 701/29.1, 32.4, 32.5, 408, 425, 447, 701/451, 453, 469, 300, 533; 340/425.5, 340/438, 439
See application file for complete search history.

(56) References Cited

U.S. PATENT DOCUMENTS

| | | | | |
|---|---|---|---|---|
| 2007/0057781 | A1 * | 3/2007 | Breed | 340/457.1 |
| 2009/0271107 | A1 * | 10/2009 | Smith | 701/201 |

* cited by examiner

*Primary Examiner* — Gertrude Arthur Jeanglaude
(74) *Attorney, Agent, or Firm* — Scott D. Barnett; Troutman Sanders LLP

(57) ABSTRACT

In exemplary implementations of this invention, data regarding the position and operation of a vehicle is gathered by a GPS unit and an On Board Diagnostic ("OBD") port, respectively. This data is wirelessly transmitted by a wireless transceiver located in the vehicle. The transmitted data from multiple vehicles is received by a remote processor. The data is processed and selectively shared with users of a public web interface, in accordance with user preferences. A user selects the type of data that may be shared and the specified persons, classes of persons or public with whom particular data or types of data may be shared. In some cases, data gathered by the OBD ports and GPS units is transmitted to a host server of a social network, and selectively shared over the social network in accordance with that network's policies.

20 Claims, 18 Drawing Sheets

| TIME 400 | KPH 401 | MAF 402 | COORDINATES 403 | EVENTS 404 |
|---|---|---|---|---|
| 9/12/09 7:55:20 PM EDT | 0 | 384 | ??? 405 | ENGINE ON:<br>OBD-II HARDWARE ID: 123-456-789 406<br>DRIVER ID: 111-222-333 |
| 9/12/09 7:55:20 PM EDT | 0 | 386 | ??? | |
| 9/12/09 7:55:23 PM EDT | 0 | 604 | 42.295, -71.131 | |
| 9/12/09 7:55:26 PM EDT | 6 | 1617 | 42.295, -71.132 | |
| 9/12/09 7:55:29 PM EDT | 18 | 2717 | 42.295, -71.133 | |
| 9/12/09 7:55:32 PM EDT | 36 | 3602 | 42.295, -71.134 | SYNCH. WiFi. SSID: "freeWifi" 407 |
| 9/12/09 7:55:35 PM EDT | 48 | 3616 | 42.295, -71.135 | |
| 9/12/09 7:55:38 PM EDT | 56 | 3061 | 42.295, -71.136 | |
| 9/12/09 7:55:41 PM EDT | 62 | 2781 | 42.295, -71.137 | |
| 9/12/09 7:55:44 PM EDT | 68 | 2744 | 42.295, -71.138 | |
| 9/12/09 7:55:47 PM EDT | 74 | 2787 | 42.295, -71.139 | |
| 9/12/09 7:55:50 PM EDT | 78 | 1908 | 42.295, -71.140 | |
| 9/12/09 7:55:53 PM EDT | 78 | 1535 | 42.295, -71.141 | |
| 9/12/09 7:55:56 PM EDT | 82 | 2300 | 42.295, -71.142 | |
| 9/12/09 7:55:59 PM EDT | 84 | 2450 | 42.295, -71.143 | |
| 9/12/09 7:56:02 PM EDT | 88 | 2450 | 42.295, -71.144 | |
| 9/12/09 7:56:05 PM EDT | 90 | 2231 | 42.295, -71.145 | |
| 9/12/09 7:56:08 PM EDT | 94 | 1556 | 42.295, -71.146 | |
| 9/12/09 7:56:11 PM EDT | 92 | 2049 | 42.295, -71.147 | |
| 9/12/09 7:56:14 PM EDT | 96 | 3100 | 42.295, -71.148 | |
| 9/12/09 7:56:17 PM EDT | 98 | 3134 | 42.295, -71.149 | |
| 9/12/09 7:56:20 PM EDT | 100 | 2830 | 42.295, -71.150 | |
| 9/12/09 7:56:23 PM EDT | 100 | 1771 | 42.295, -71.151 | |
| 9/12/09 7:56:26 PM EDT | 98 | 2466 | 42.295, -71.152 | |
| 9/12/09 7:56:29 PM EDT | 100 | 2786 | 42.295, -71.153 | |
| 9/12/09 7:56:32 PM EDT | 102 | 2800 | 42.295, -71.154 | |
| 9/12/09 7:56:35 PM EDT | 102 | 2720 | 42.295, -71.155 | |
| 9/12/09 7:56:38 PM EDT | 100 | 3466 | 42.295, -71.156 | |
| 9/12/09 7:56:38 PM EDT | 96 | 2789 | 42.295, -71.157 | CODES P0301, P0302 408 |
| ... | ... | ... | ... | ... |
| 9/12/09 10:05:05 PM EDT | 12 | 312 | 42.295, -71.500 | |
| 9/12/09 10:05:08 PM EDT | 10 | 306 | 42.295, -71.501 | |
| 9/12/09 10:05:11 PM EDT | 6 | 389 | 42.295, -71.502 | |
| 9/12/09 10:05:14 PM EDT | 4 | 327 | 42.295, -71.503 | |
| 9/12/09 10:05:17 PM EDT | 2 | 312 | 42.295, -71.504 | |
| 9/12/09 10:05:20 PM EDT | 0 | 312 | 42.295, -71.505 | ENGINE OFF 409 |

FIG. 4

METHODS AND APPARATUS FOR AUTOMATIC INTERNET LOGGING AND SOCIAL COMPARISON OF VEHICULAR DRIVING BEHAVIOR

RELATED APPLICATIONS

This application claims the benefit of U.S. Provisional Application Ser. No. 61/260,335 filed Nov. 11, 2009, U.S. Provisional Application Ser. No. 61/348,534 filed May 26, 2010, and U.S. Provisional Application Ser. No. 61/363,974 filed Jul. 13, 2010. The entire disclosures of each of those provisional patent applications are herein incorporated by reference.

FIELD OF THE TECHNOLOGY

The present invention relates generally to On-Board-Diagnostics ("OBD") devices and Global Positioning System ("GPS") devices installed in vehicles.

SUMMARY

In exemplary implementations of this invention, data regarding the position and operation of a vehicle is gathered by a GPS unit and an On Board Diagnostic ("OBD") port, respectively. This data is wirelessly transmitted by a wireless transceiver located in the vehicle. The transmitted data from multiple vehicles is received by a remote processor. The data is processed and selectively shared with users of a public web interface, in accordance with user preferences. A user selects the type of data that may be shared and the specified persons, classes of persons or public with whom particular data or types of data may be shared. In some cases, data gathered by the OBD ports and GPS units is transmitted to a host server of a social network, and selectively shared over the social network in accordance with that network's policies.

According to principles of this invention, selective sharing of data may be implemented so as to allow a community of users to automatically log and share data related to the operation and routes driven by their vehicles. For example, such operational data may include fuel economy data.

Or, for example, the selective sharing of operational and route data may be implemented as an automated rideshare introduction service. Such a service may automatically identify riders who frequently drive a similar route, and allow them to interact to determine if they want to rideshare.

According to principles of this invention, selective sharing of information may be used to implement a public automotive performance database with user-selectable permissions. This database may be generated by data collected from vehicles, using the apparatus described above. Such a database may be searched on a public web interface that allows a user to search by specific model and geographic area, thereby allowing a user to obtain data regarding actual performance of a specific type of car in a particular locality.

In some instantiations, expense reports of driving-related expenses may be generated based in part on information about where a vehicle traveled and stopped, which may be obtained from data gathered by the GPS unit installed in that car. For example, data regarding the schedule of parking fees charged by a parking lot may be correlated with GPS data indicating that a vehicle stopped at that parking lot for three hours, in order to generate an estimate of the parking fees incurred. Or, for example, GPS data regarding the points at which a car entered and exited a toll may be correlated with a database of toll charges for different trips, in order to generate an estimate of the toll fees incurred.

According to principles of this invention, data gathered by GPS units and OBD ports may be used to implement a public web interface that provides social recognition of virtuous driving behavior. For example, a person who gets the best fuel efficiency for a particular type of car in a particular area may be designated a "Chauffer".

This invention may allow a user to input data indicating how to classify a specific expense (e.g., as business or personal), or to input rules regarding how to classify expenses (e.g., a trip to Grandma's home is personal).

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 4 shows an example file format of trip data

Figure 1:
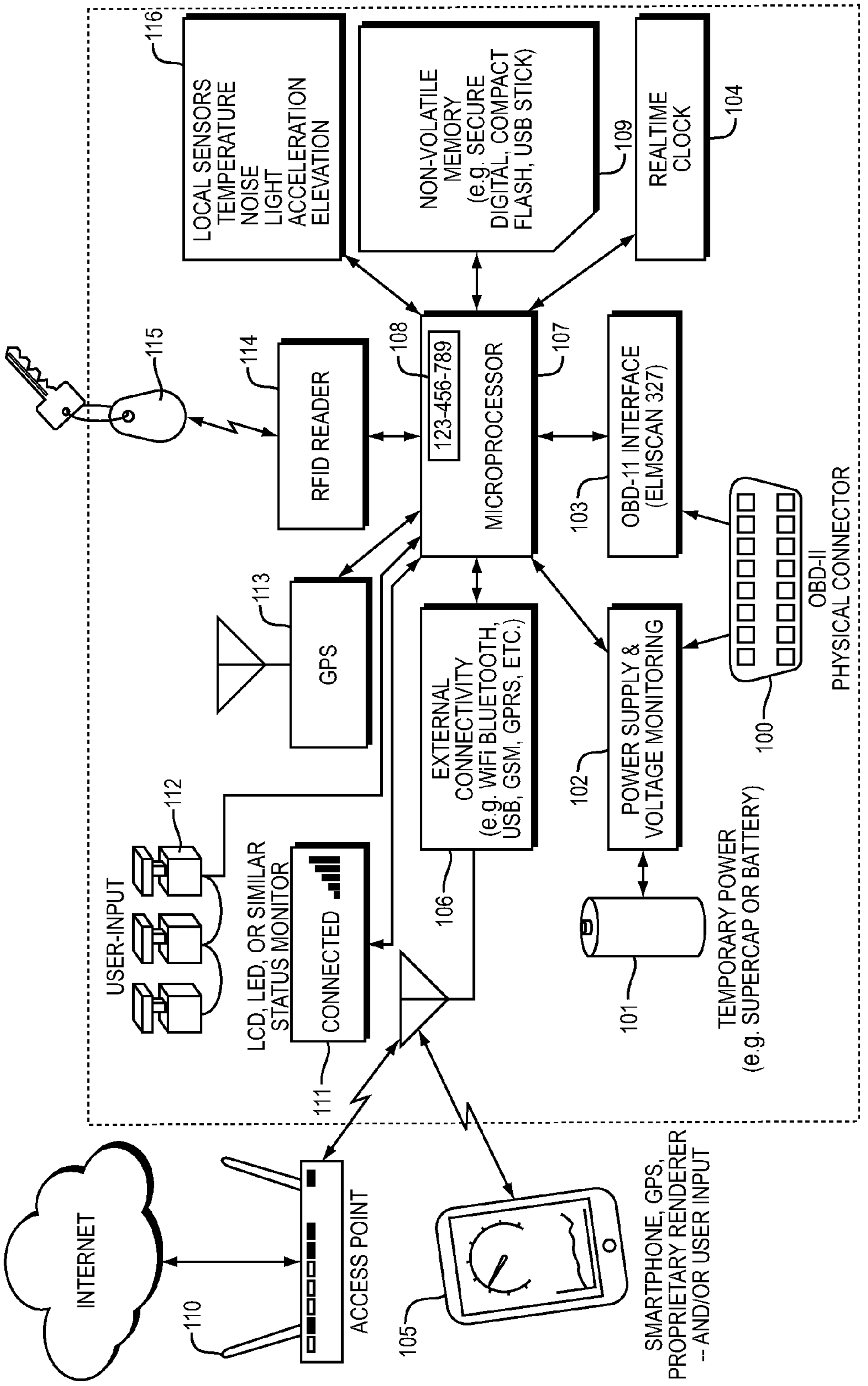
FIG. 1 shows a schematic block diagram of an OBD hardware accessory.

The above Figures illustrate some illustrative implementations of this invention, or provide information that relates to those implementations. However, this invention may be implemented in many other ways. The above Figures do not show all of the details of this invention.

DETAILED DESCRIPTION

In an exemplary implementation of this invention, an On-Board Diagnostic device may attach to a vehicle's on-board data port and record driving behavior such as speed and fuel consumption. This data may then automatically be transferred, by wireless connection, to an Internet database where it is stored. A processing unit may analyze this data and output statistics such as overall distance driven and average fuel economy. These statistics may also include comparisons with similar vehicles in terms of parameters such as size, geographical location, or distance driven. They may also include comparisons to prior vehicular performance allowing the user to determine, for example, if fuel economy has changed. These statistics may be displayed in web interfaces or sent to users by email or other electronic notification. Users wishing for more information can view and annotate individual trips. An accessory GPS signal may allow performance to be correlated with location.

This invention may be implemented as a vehicle performance monitoring system comprising one or more OBD hardware electronic accessories and one or more host services computers connected to the Internet. These computers may be adapted for accepting data regarding vehicle performance, analyzing it and outputting information, including through web interfaces.

In an exemplary implementation of this invention, an OBD hardware accessory may have the following features: (1) an OBD connector that communicates with the automobile and reads content such air intake (MAS), speed, or engine revolutions per minute (RPM); (2) access to on-board, removable, or remote non-volatile memory (e.g. compact flash); (3) access to an on-board or remote microcontroller for reading real-time data from (1) and logging it to the memory in (2), and (4) apparatus for transfer of this logged data to a database located on the Internet. In exemplary implementations, an OBD hardware accessory also includes a GPS module. Alternately, an OBD hardware accessory does not include a GPS module. In that alternate case, a separate GPS unit may be installed in the vehicle, or there may be no GPS unit installed in the car at all.

For example, an OBD hardware accessory may be implemented in a stand-alone module that includes an OBD connector, flash memory, microcontroller, and WiFi radio. The microcontroller reads and stores OBD data on the flash card. When the OBD hardware accessory is in the presence of a WiFi access point, this cached data is uploaded to a centralized database. The cached data is then erased or marked as purgable so new data can be written.

Other instantiations include an OBD connector that is attached to a cellphone or Personal Navigation Device (PND) and uses the microcontroller and non-volatile memory and connectivity on that device to cache and transfer content to an internet connected database. An example of a PND is the Nuvi 1200 from Garmin International of Olathe, Kans. This device has more than enough computing power and storage to read and log OBD data.

In an exemplary implementation of this invention, one or more host services computers connected to the Internet may be employed to provide a website. This website may include any or all of the following features: (1) A database for storing the driving parameters generated in part I section 4 (above), or generated by any device capable of generating this data format; (2) a website/widget/application or other form of electronic rendering and interaction allowing users and authorized agents to log in, view, annotate, manage and share their driving data as well as compare themselves and their vehicle to other drivers and vehicles, and (3) processing units for analyzing this data and outputting updates about trips, vehicles, and drivers to various destinations based upon user-configurable rules.

For example, the host services computers may be adapted to accept preference data from users in such a manner that users can configure this service to send out a Twitter or SMS message at the completion of every trip that shows amount of gas used.

In illustrative implementations of this invention, the OBD hardware accessory may be adapted to remain in the vehicle after installation. It does not need to be periodically removed or serviced. Data is transferred via a WiFi or other wireless connection, making this device very low-maintenance. Because OBD connectors are typically out of view under the dashboard, this device does not present a security risk.

According to principles of this invention, a repository of actual driving behavior may be created for the purpose of helping drivers use less fuel, save money, and be more "green". In exemplary implementations, this invention may facilitate this virtuous behavior for at least three reasons:

First, this invention may be employed by users to compare the fuel economy of their vehicle to others. For example, drivers can compare themselves to other drivers with similar cars, who drive a similar number of miles, or live nearby. This allows drivers to contextualize and quantify their vehicular and driving patterns.

Second, this invention may allow users to easily log their driving data. Visibility into peer's driving behavior can trigger mild competitiveness that encourages drivers to do better. Drivers will try to see who can get the best fuel economy or who can use the fewest gallons of gas.

Third, this invention may notify a user of low fuel efficiency. Fuel economy significantly below average often indicates the vehicle needs servicing. Early detection may lower the cost of the repair as well as return the car to peak fuel efficiency sooner.

For companies that operate vehicular fleets for their employees, this invention can (in some implementations) lead to cost savings by encouraging drivers to use less fuel. In some instantiations, a system of rewards can even allow employees to share in some of the savings resulting from increasing fuel economy.

This invention may be implemented in such a way that it includes a GPS unit to detect and record vehicular location. In some instantiations, vehicle location is recorded along with OBD content. This gives users additional details on their driving habits as well as allowing all users to forecast likely fuel consumption for a given journey. For example users with a choice of different routes between home and work may discover that one route uses less fuel than the other. In some instantiations, the OBD hardware accessory is adapted so that a GPS unit can be added later (after the OBD hardware is installed in the vehicle). Alternately, a GPS unit may be used to record location data even though OBD data is not used.

FIG. 1 shows a block diagram on OBD hardware accessory, in an illustrative implementation of this invention. TTT Data is read via the OBD connector [100]. This connector also provides 12-volt power that is regulated by a power supply [102] and distributed to various components as needed. Most components will need this 12 volts reduced to 3.3 or 5 volts. OBD connectors supply 12-volt power even when the car is not running and the keys are removed. Therefore, it is very important the power supply draw less than a few milliamps of power when the car is not running to not drain the car's battery.

The power supply [102] also monitors the battery voltage to help the processor determine when the vehicle engine has been started and the processor needs to come out of low-power state. Because OBD was developed as a supervised diagnostic tool, there is typically no automatic means to signal the vehicle engine has started running Monitoring the battery voltage and looking for changes in voltage associated with activity such as turning on the interior lights or running the starter motor is a quick and low-power means to determine of the vehicle is running and the hardware accessory should power any additional accessories such as a GPS unit and start logging data.

A microprocessor [107] reads real-time data from the OBD connector [100] via a translator chip such as the Elmscan 327 from Elm Electronics of Toronto Canada [103]. Note it is possible to combine the functionality of the Elmscan 327 chip [103] into the microprocessor [107]. This can result in cost savings and smaller physical size. The microprocessor then writes the OBD data to the non-volatile memory [109]. This memory is a combination of removable and/or built-in memory. Removable memory is a convenient method of transferring logged data to an Internet connected computer, and built-in memory stores logged data if a memory card is not inserted. Data from the built-in memory is transferred to the removable memory card once it is re-inserted.

The microprocessor also stores a unique ID [108] that is factory programmed. This ID allows data sent to the online database to be correlated with a specific vehicle. This serial number can also be stored in non-volatile memory [109]. On many cars, the unique vehicle identification number (VIN) can also be read from the OBD-II connector. This can be included in the data as an alternative means for users to find their data online and may even eliminate the need for the OBD hardware accessory to have a serial number [108][201] at all.

The microprocessor controls a wireless radio [106] that is always scanning for one or more types of external connectivity such as a WiFi access point [110], bluetooth, GSM, GPRS, cellular, wireless USB, proprietary USB, wired, or any other protocol that enables the OBD hardware accessory to attach to an external device to transfer data. Once a successful attachment to the Internet is made, the microcontroller transfers the contents of the non-volatile memory to the database [511] and either erases the data or marks it as purgable so new data will overwrite old.

In the example shown in FIG. 1, the non-volatile memory can also store the SSID, passwords, and other configuration parameters for connecting to specific access points. This can be encrypted for additional security. Another security option is for the microprocessor to copy this data to internal non-volatile memory and then delete this info off the flash card. The microprocessor uses the connection parameters stored on internal non-volatile memory to make connections. A reset button may be used to erase this cache. This might be useful if the device is sold or transferred. A computer or cellphone with a full user interface is used to place the connection parameters on the flash card.

The external connectivity can additionally be used to connect with an external rendering device such as a smartphone [105] with appropriate software installed; or it can connect with a proprietary display [111] that is mounted on the user's dashboard or installed on the user's keychain. This display may show fuel economy and other parameters in real-time as the vehicle was being operated. This display may also show the last time data was transferred from the non-volatile memory to the Internet database.

In some cases, the external rendering device can also act as user input [112]. For example, the user can press a button or control to indicate the trip is for business and can therefore be expensed. Or if the vehicle has multiple drivers, each can be assigned a button. Or users can input parameters such as towing load, presence of a roof rack, or if a pickup truck has a camper shell or the tailgate up or down. These parameters are important because they affect fuel economy and are generally not detectable by the OBD or similar infrastructure.

In the example shown in FIG. 1, the microcontroller can also control an additional built-in display or local input showing similar data. This display may also include a warning light (or buzzer) if the hardware accessory has not been able to connect to the Internet and the non-volatile memory is full. Similarly the buttons may be dedicated to driver selection.

In some instantiations, the microcontroller also communicates with sensors that are not part of the vehicles on-board computer system [116]. Here are some examples: (1) Temperature sensors: Starting temperature may be correlated with fuel economy; (2) Noise sensors (to help detect problems with the car): In some instantiations, noise sensors detect overall acoustic energy. In other instantiations, digital signal processing detects an audio signature indicating regular operation or problems with the vehicle, (3) Light sensors: Help determine if vehicle was started during the day or night/indoors or outdoors; (4) Acceleration sensors: Can be used with vehicle speed to detect if car is going up or down hill. If vehicle speed is unchanging (zero acceleration), the accelerometer indicates overall vehicular tilt. Tilt impacts fuel economy because the engine must work harder to go up a hill. Speed can be determined either from the GPS unit or from the OBD-II vehicle speed reading, (5) Barometer: Can determine elevation. Similar to acceleration, this can indicate change in altitude.

During synchronizations, the real-time clock is also updated [104] by connecting to a public or private Internet based time-server such as "time-a.nist.gov". This clock maintains time even when the OBD hardware accessory is not powered through addition of a backup battery or supercapacitor [101].

In the example shown in FIG. 1, time of trip can also be inferred by simply keeping track the durations between each trip and then reconstructing the time once the data is uploaded to a server with accurate time. For example, if a user is uploading data at 4:00 PM and a trip was 3 hours ago, the trip occurred at 1:00 PM. Given the latency of a typical Internet connection, this should be accurate to within a few seconds. Note this will not work if the data is uploaded directly off the flash card because the time duration between removal of the flash card and upload to the database is not known.

The microprocessor may also communicate with a GPS module [113]. If the GPS is present, longitude, latitude, altitude, speed, acceleration and other data from the GPS chipset are recorded on the non-volatile memory along with the fuel economy and other OBD information. This GPS may be dedicated to the OBD hardware accessory or part of a personal navigation device or cellphone with GPS functionality.

The microprocessor may also communicate with a RFID reader [114]. This may detect a unique RFID tag placed on the user's keyring [115] and may allow the OBD hardware accessory to determine who is driving the car. This is useful for vehicles where there is more than one driver. Depending on the location of the OBD connector, it may be desirable to make the RFID detector separate from the OBD hardware accessory so it can be placed close enough to the key ignition slot to detect the RFID tag. Additionally, it is desirable that the RFID be far enough from the passenger seat to not detect the RFID tag of any passengers that may also be drivers. If the RFID detector is in a separate enclosure from the OBD hardware accessory, it can be attached either wirelessly or with a wire.

This invention may use other types of electronic tagging to identify a driver, instead of RFID. For example, in some instantiations, the unique bluetooth name of a cellphone may be used to identify a user. This has the potential problem of detecting both cellphones if two drivers are in the car at the same time. To solve this problem, an app on the cellphone may be manually activated by the driver actually driving the car to disambiguate the situation. Or, for example, a driver may be identified by a unique electronic tag in a key that is detected when the key is inserted into the ignition. Alternately, scanners in the driver's seat coupled with tags in a user's wallet may be used to detect drivers. Also, a signal processing algorithm may be able to differentiate drivers by establishing a "digital fingerprint" associated with each driver's driving style.

Figure 2:
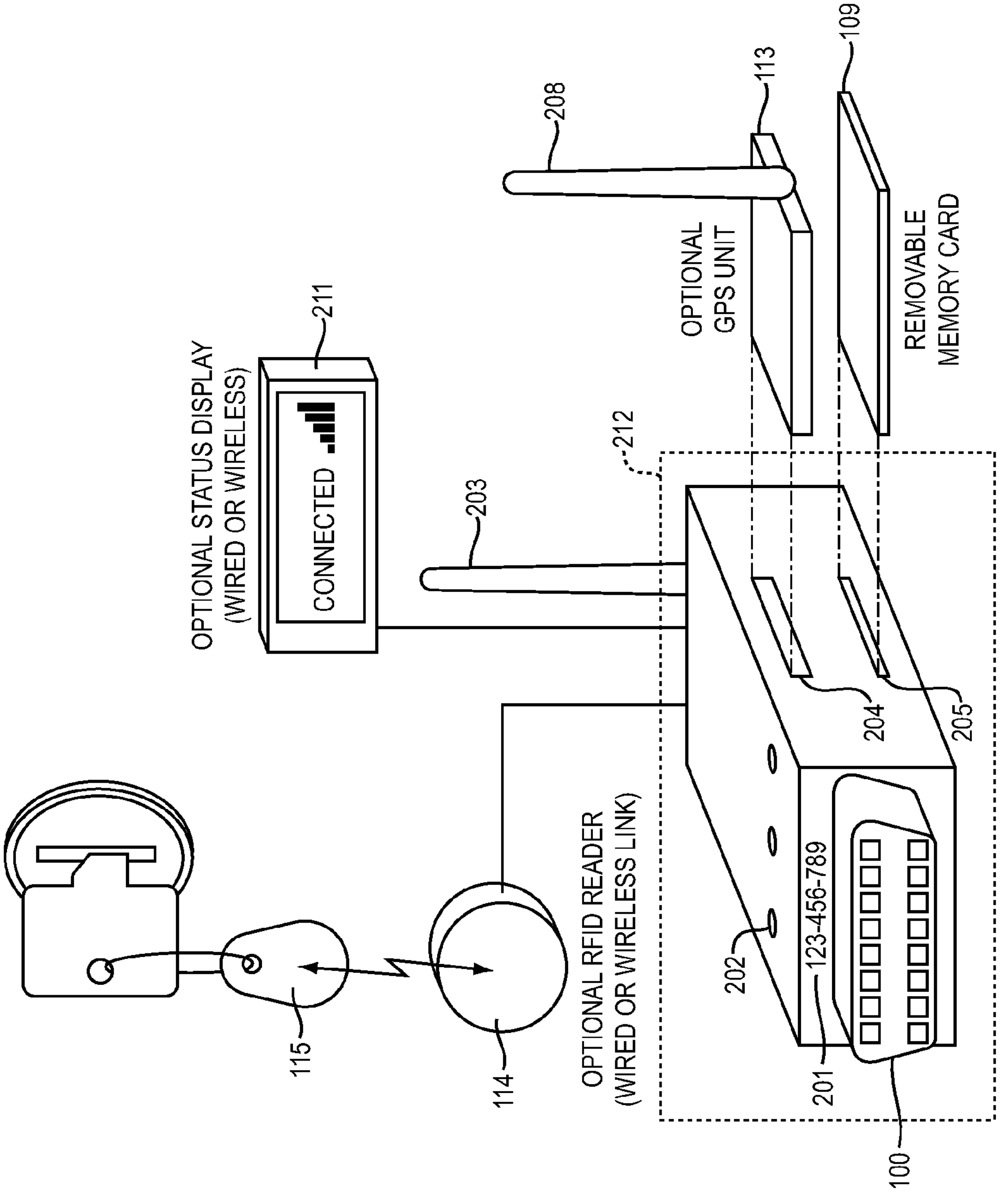
FIG. 2 shows an example physical embodiment of an OBD hardware accessory

FIG. 2 shows an OBD hardware accessory, in illustrative implementations of this invention. The OBD hardware accessory [212] connects directly to the OBD port on the car via a connector [100]. Note that size considerations may require the hardware device to attach to the OBD port via a cable.

In the example shown in FIG. 2, an OBD connector of the opposite gender on the rear of the OBD hardware accessory (not shown) allows the OBD hardware accessory to act as a pass-through so additional OBD hardware devices can be daisy-chained. However, older versions of the OBD protocol do not readily accommodate more than one device making queries at a time. This invention may be implemented in such a way that, when dealing with such older versions, the microcontroller listens to requests and responses between the third-party OBD hardware and only attempts to issue a query if the desired query is not already being issued.

The enclosure also has an antenna for external wireless communication [203]. The antenna is shown attached to the enclosure, but it may also be attached via a cable so it may be positioned away from the enclosure for better reception.

The enclosure has an opening [205] for a memory card [109] such as secure digital, compact flash, or USB memory stick. A GPS unit [113] can be inserted [204] to record location along with engine and driving parameters. The GPS unit can have an external antenna [208] that can be attached directly to the GPS card [113] or via a cable. Alternately, a GPS antenna may be integrated into the main antenna [203]. Also, it is possible for the GPS and/or the memory to be permanently attached to the PC board internal to the enclosure.

Each unit is marked with a unique serial number [201] that matches the serial number stored in the microprocessor or non-volatile memory [108]. This serial number can be a copy or derivative of the MAC address (Ethernet/WiFi), or IMEI number (GSM), or independently generated.

Status LEDs [202] on the unit display parameters such as "memory full" if the hardware is unable to connect to an access point and the memory runs out of space. These LEDs can also indicate if the device is working properly or it has recognized a specific driver. Alternately, the LEDs may be replaced by a LCD display, as well as supplemented by an external display [211]. This external display can be attached via a wire or wirelessly. If attached wirelessly, the external display may be battery powered and mounted on the dashboard or attached to the user's keyring. However, dashboard mounting may not be practical for night driving if the device requires illumination to be seen. In this case, the display accessory may be powered by the 12-volt "cigarette lighter" found in virtually all cars.

If the external display is attached via a wire to provide power for the backlight, this wire may be substantially thinner and more flexible than the wire for the cable to attach to the OBD connector. This is due to the fact it will have fewer wires. In order to read all protocols, an OBD cable may need 9 wires. But an external display can be connected with as few as three wires (power, ground, data), making the cable can be much thinner. All the OBD display units described in the introduction use a thick 9-conductor cable between the OBD connector and the display housing.

A RFID reader [114] may also be attached to the hardware device to detect who is driving the car. Similar to the display described above, this may be attached via a wire or wirelessly. But unlike the display described above, it may be practical to power the RFID reader with a battery and have acceptable battery life. A RFID key fob [115] attached to the user's keyring indicates which user is driving the car. Furthermore, the RFID keyfob can include the external display [211] in the same housing. In this case, the RFID reader may be used to charge the display while the vehicle is operating.

In exemplary implementations of this invention, the physical hardware device does not require any tools to be installed. The OBD connector contains an interlocking tab and enough friction in the connector it will not come loose during normal driving.

FIGS. 3A-3G show some transport mechanisms for getting content from the OBD hardware accessory to the Internet, where it can then be connected to the driving database, in illustrative implementations of this invention.

Figure 3A:
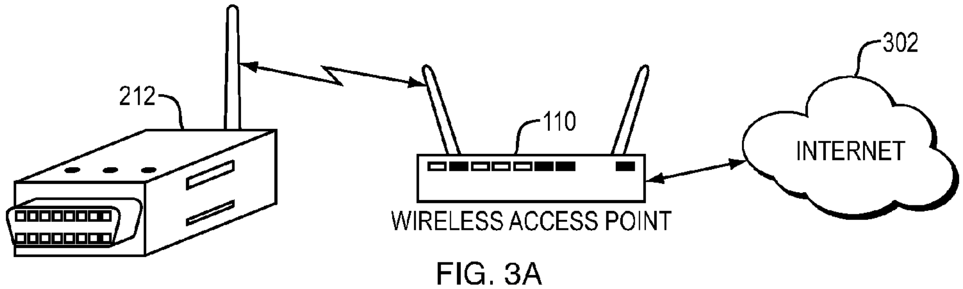
FIG. 3A-3G show how data is transferred from an OBD hardware accessory to the Internet, in different implementations of this invention.

In FIG. 3A, the OBD hardware accessory [212] connects to a wireless access point [110], which is then connected to the Internet [302]. This can be a public access point that does not require any password or other credentials to connect. Examples of this are found at coffee shops and other businesses serving the public. The hardware device can also connect to private access points that require credentials. These credentials can be stored in the flash memory card. In FIGS. 3A to 3G, the OBD hardware accessory [212] includes a GPS unit. In alternate implementations, it does not.

Additionally, connection to a private WiFi access point can be facilitated by WiFi Protected Setup (WPS) which is a standard for connecting devices to wireless access points. This standard was approved by the Wi-Fi Alliance on Jan. 8, 2007.

In the example shown in FIG. 3A, successful connections are logged along with OBD data. On units with a GPS, the location of public access points can be shared with other users. This creates a geographic map of available access points that can be used to guide other all seekers of connectivity—whether they are in a vehicle and using an OBD hardware accessory or simply travelers looking to connect their laptops to the Internet.

Some public access points require the user to accept a "terms of service" agreement by clicking or checking an "OK" button on a web browser. In some implementations of this invention, these terms are accepted automatically, in order for the OBD hardware accessory to connect to these access points. For example, this automatic acceptance may be done by using a heuristic to search for keywords such as "OK" and "ACCEPT" or by caching the web page details for review by a human operator once the hardware device is able to successfully connect to another access point. The human operator may consent or decline the terms of service and then forward automation instructions for how to connect back to the OBD hardware accessory during the next synchronization. Additionally, the heuristic for automatic acceptance can also be updated during synchronizations. The OBD hardware may cache a browser cookie in order to stay connected.

In illustrative implementations of this invention, attempts to connect to an access point are made continuously while the vehicle is operational. Many vehicles are parked in garages where a wireless signal may be weak and require several attempts to connect. If using the vehicle's battery, some type of voltage monitor or heuristic may be employed to prevent battery drainage. For example, the OBD accessory may try to connect less frequently each additional hour and totally stop if battery voltage falls below a certain level.

Figure 3B:
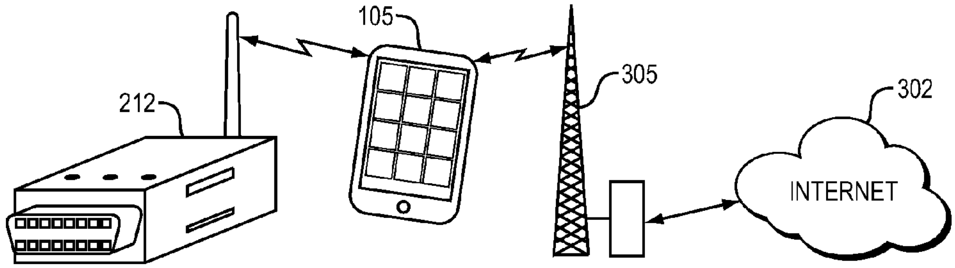

FIG. 3B shows a cellphone [304] mediating the link between the OBD hardware accessory [212] and the Internet

[302], in illustrative implementations of this invention. In the case where the cellphone acts as a WiFi access point, linkage is identical to FIG. 3A. This is often a preferred method of connecting laptops and other mobile WiFi enabled devices to the Internet because it utilizes existing hardware and protocols. In the example shown in FIG. 3B, the OBD hardware accessory does not differentiate between an access point provided by a cellphone [105] and an access point provided by a wired Internet service provider [301].

A cellphone can also mediate the data connection by providing a bluetooth link between the OBD hardware accessory and then relaying the data over a GPRS or similar link. In this case, the cellphone may have custom software installed that looks for the bluetooth connection to the OBD hardware accessory and then transfers that data to a specified website database. This software may run in the background on phones that allow multiple applications to run. On phones that only allow a single application at a time, this software may be manually launched by the user.

If the cellphone is out of range of a telecommunications carrier [305], data is cached locally—either on the hardware device or on the cellphone. Caching data on the cellphone allows data transfer once the phone enters a service area, regardless of the vehicle's coverage. This may be useful if the vehicle is parked in a garage that does not have cellphone service. If content is cached on the OBD hardware accessory, the trip will not be uploaded until the vehicle is driven next. If content is cached on the cellphone, the trip is uploaded much sooner. With a cellphone connection, data can up uploaded periodically or continuously in real-time.

Figure 3C:
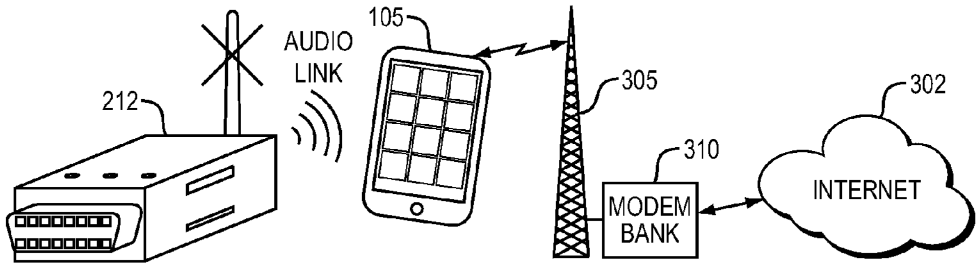

FIG. 3C shows an audio link between an OBD hardware accessory [212] and a cellphone [105], in illustrative implementations of this invention. In this case, the hardware device has a speaker and it emits tones that encode the trip data. The phone then makes a voice call to a modem bank [310] where the tones from are decoded into data packets and sent on the Internet to the database [302]. This has the advantage of working on all cellphones, not just phones with data plans and/or bluetooth connectivity. The path from the OBD hardware device to the phone to the telecommunications carrier is audio, so it has a wide range of compatibility. The audio does not get converted into data until the modem bank [310] which is then connected to the Internet or directly connected to the database.

An alternative to the implementation shown in FIG. 3C is for the phone to have a local application that hears the tones and translates it to data on the phone, and then uses a GPRS or similar connection as described above to send the data over the Internet to the database. This has the advantage of enabling data transfer while the phone is out of coverage.

In both cases, the user may need to launch a connection session to transfer data. Given road and engine noise, the vehicle may have to be not moving for this to work. Trip data may be stored locally on the OBD hardware between sessions. Once data is transferred to the cellphone, data is cached on the cellphone until the cellphone is in range of a telecommunications carrier.

If data synchronization includes transferring data from the server to the OBD hardware accessory using an audio link, the OBD hardware accessory may also have a microphone to detect audio from the cellphone.

A microphone and speaker are only one instance of transducers that can mediate an audio link. The OBD hardware accessory can also transfer audio data with a cellphone via a wired or wireless (e.g. bluetooth) connection to the cellphone. In this way, the OBD hardware device may appear to the cellphone identical to a wired or wireless hands-free headset.

Figure 3D:
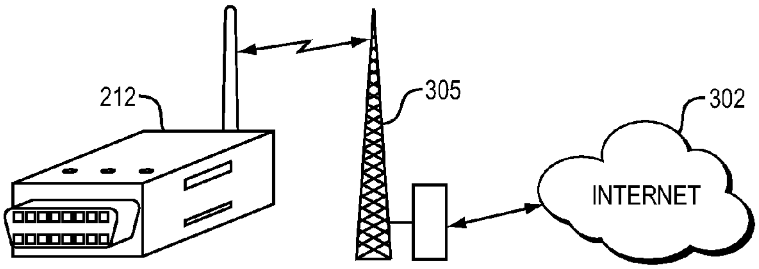

FIG. 3D shows the hardware device [212] with a built-in GPRS modem, in illustrative implementations of this invention.

This invention may be used to advantage for real-time monitoring of trips. This may allow, for example, a parent to monitor a teenager's driving behavior and be alerted in real-time if some pre-selected operational parameter (e.g. excessive speed) is out of bounds. Connection schemes that rely heavily on caching do not report status until after synchronization has occurred. Of course if the OBD hardware accessory is outside cellphone service area, reporting may wait until the vehicle re-enters coverage.

FIG. 3D is similar to 3B but with a dedicated cellphone included in the same physical housing as the OBD hardware accessory.

Figure 3E:
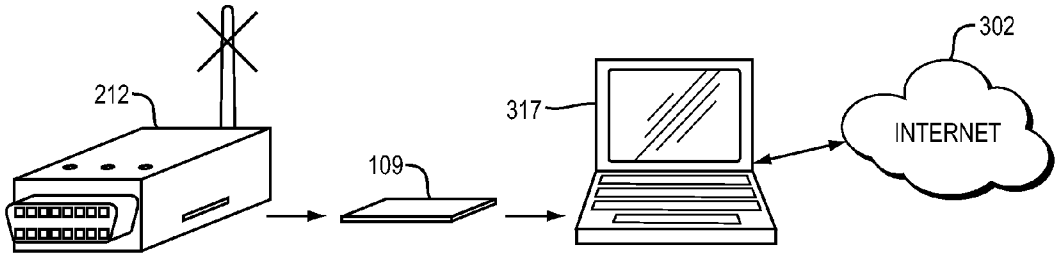

FIG. 3E shows data being transferred to the Internet [302], in illustrative implementations of this invention, by removing the flash card [109] from the hardware device [212] and inserting into a computer connected to the Internet [317]. This may also be a USB memory key. In the example shown in FIG. 3E, once this portable memory is connected to a computer, trip data is uploaded to the database. Software installed on the PC recognizes this content as trip data and handle much or all of the upload automatically. Additionally, in the same connection session that trip data is being uploaded to the database, any content for transfer from the database to the vehicle is placed on the flash memory for communication to the vehicle once the memory device is reinserted into the OBD hardware accessory.

In the example shown in FIG. 3E, once upload is complete, the flash card is returned to the OBD hardware accessory so it can record more data. The OBD hardware accessory might also have some built-in non-volatile memory to store trip data if the user does not re-insert the flash memory. In this case, the data from the built-in non-volatile memory may be transferred to the flash memory once it is inserted and the content on the built-in memory erased or marked as purgeable.

Figure 3F:
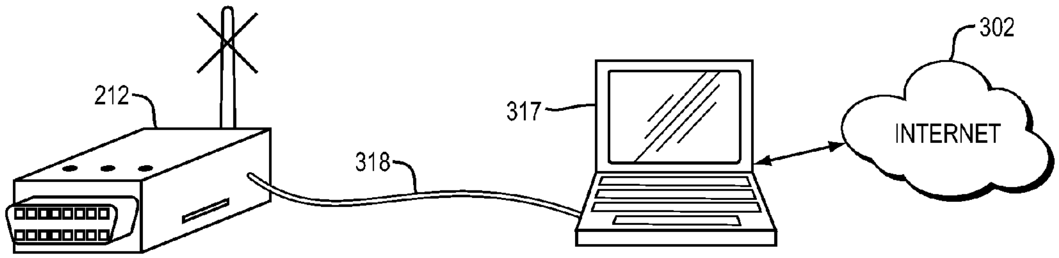

FIG. 3F shows data being transferred to the Internet [302] by attaching to a computer [317] with a cable [318], in an illustrative implementation of this invention. This can be a USB, serial, firewire, or any other cable attachment. The computer may also include client software to locally store and process the OBD-II information.

Figure 3G:
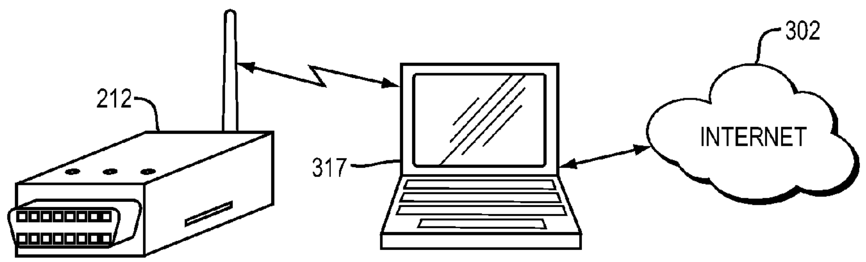

FIG. 3G is similar to 3F but the data is transferred to the computer via a wireless link such as bluetooth, wireless USB, zigbee, or any variants of these protocols.

FIG. 4 shows an example of trip data as stored on the non-volatile memory [109] and transferred to the database, in an illustrative implementation of this invention. This shows the time of each reading [400], of Kilometers Per Hour (KPH) value [401] as well as Mass Air Flow (MAS) value [402] in grams per second. From these two parameters, knowing the fuel-air ratio (14.7) and the pounds per gallon of unleaded fuel (6.17) fuel economy (Miles Per Gallon) can be computed. Cars that allow direct access to fuel economy may bypass this calculation. Any other parameter available via the OBD interface can also be logged. However, on some cars, it can take up to 200 milliseconds to log each parameter, so logging too many parameters can increase the granularity of the data and possibly make it less accurate and useful. Parameters such as the vehicle identification code (VIN) may be recorded once because this does not change for the life of the car.

In the example shown in FIG. 4, OBD hardware accessories with the GPS also record longitude, latitude, and elevation [403]. It can take GPS units a few seconds to a few minutes to acquire initial position signal, so until the GPS has a location, coordinates are marked with a question mark [405].

Trip data also records events [404] such as the engine turning ON and OFF [406], [409], and any trouble codes [408] reported by the vehicle's on-board computer. If drivers are electronically tagged (e.g. RFID tag) this is also recorded in the trip data [406]. Also recorded is the hardware ID of the OBD hardware accessory [406]. Times and location of synchronizations are also recorded, along with the SSID of the access point [407]. This information can be used to aid other drivers looking for opportunities to synchronize trip data.

In FIG. 4, this file is showed in very verbose format to illustrate the content it contains. But because data is gathered at 3-second intervals, it is possible to remove timestamps after the first one.

This data in FIG. 4 is generated by the OBD hardware accessory described above. But this data can be generated from any number of hardware devices. For example, a OBD accessory that attaches to a cellphone or PND unit (or GPS software on a cellphone) can also produce data in this format. In the arrangement where an OBD accessory attaches to a cellphone or PND unit, the hardware accessory may not need on-board non-volatile memory because these are already on the smartphone. Additionally, many cellphones now include a GPS, meaning that component is also redundant. All that is necessary is the physical connector to the OBD, an electronic interface to the vehicle's data bus, and a means to communicate locally with the cellphone or PND unit. Additionally, some of the methods described for electronic tagging (e.g. RFID) may also be desirable to disambiguate drivers in the case where more than one driver is in the car (e.g. a driver and a passenger)

In some implementations of this invention, an OBD to WiFi accessory is employed, which attaches to an iPhone® and displays real-time automotive performance metrics on the iPhone® display. The software in that accessory may allow content to be gathered in the format described here and transmitted to a website for comparison to other drivers.

The data shown in FIG. 4 lacks any sort of authentication or encryption. However, this invention may be implemented with either. For example, encryption may be implemented using a public/private key approach.

In some instantiations of this invention, data is validated by generating a unique hash based on a shared private key stored in the OBD hardware and on the database. Insofar as the hardware can obtain and maintain the privacy of this key, forged content will not be able to satisfy authentication requirements. For OBD hardware accessories that have on-board processing, this key is factory installed in the device firmware. If the hash is generated in software on a cellphone or GPS, the private key will be stored on the device where a hacker might be better able to discover this key.

Figure 5:
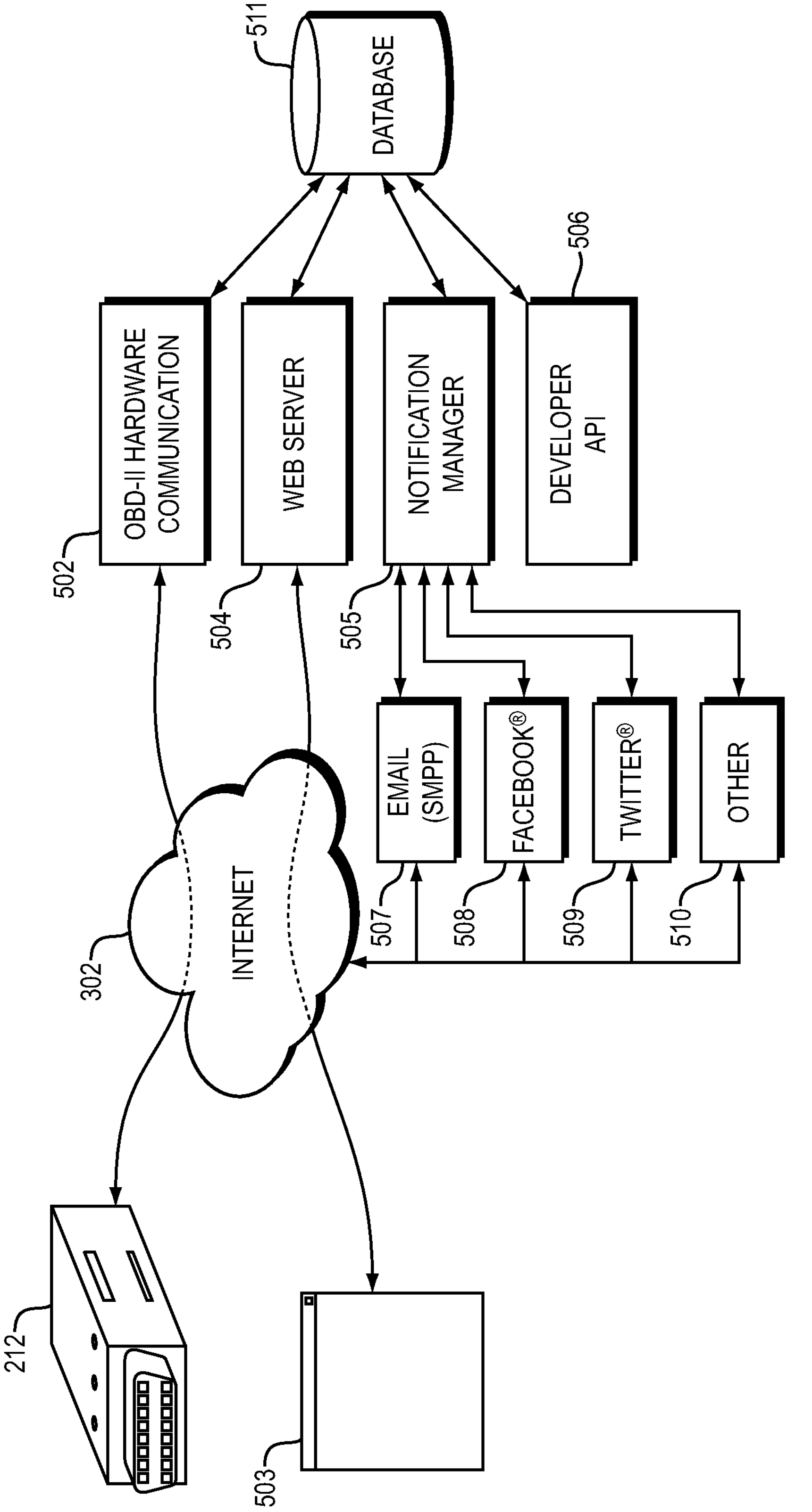
FIG. 5 shows a block diagram of a web server and database

FIG. 5 shows a block diagram of the Internet services, in an illustrative implementation of this invention. Trip data from the OBD hardware accessory [212] arrives at the OBD hardware communication module [502] via an Internet route [302]. This can be as simple as a HTTP GET or POST or port 80, or a more complex scheme using a different open or closed protocol. This trip data is tagged with the time of the synchronization as well as the GPS coordinates of the vehicle when the connection occurred, if available. This allows the database to build a map of WiFi locations.

The OBD hardware communication module [502] can also send data back to the OBD hardware. For example, the user may visit a web page that allows him or her to reset trouble codes and make the Malfunction Indicator Light (MIL) turn off. Other applications include remote door unlocks or sending the OBD hardware accessory a new firmware image that is re-flashed into the vehicle's on-board computer. Insofar as vehicle systems are on the OBD data bus, any message to any of these systems may be sent back to the OBD hardware device. This includes playlists or content for the entertainment system, preset seat positions, climate preferences, or vehicular performance profiles (e.g. comfortable ride versus responsive performance).

A web server [504] allows users to view data on a web page [503], compare to other drivers and vehicles, and create and change settings.

This data is correlated with a user via the unique ID of the OBD hardware accessory and/or the VIN and placed in the database [511] for storage. New content arrival triggers the Notification Manager [505] to send out an update according to user preferences. Preferences include doing nothing, sending an email to a specified address via a SMPP server [507], posting information about the drive on Facebook® [508], Twitter® [509], or some other service [510] such as a blog.

The Notification Manager [505] also runs a periodic service that can send updates at specific times according to user preferences. This is in contrast to updates triggered by driving events.

A developer application programming interface (API) [506] allows third parties direct access to the database, filtered by preferences individual users have specified for their content. This allows third parties to perform their own analysis of the available data set.

In the example shown in FIG. 5, the OBD hardware accessory [212] includes a GPS unit. Alternately, it does not.

In some instantiations, this invention allows automated sharing of driving data on social networks. FIG. 5 shows a diagram of how driving data uploaded to a server can be shared on social networks such as Facebook® and Twitter®. The user may configure rules to determine what criteria are necessary for a given trip to be uploaded to one of these social networking sites. For example, only trips over a certain length or distance, or only trips above or below a certain fuel-economy, or only trips with certain geographical constraints would be uploaded. The user may then use existing privacy controls on these social networking sites to control how the data is shared with others.

Figure 6:
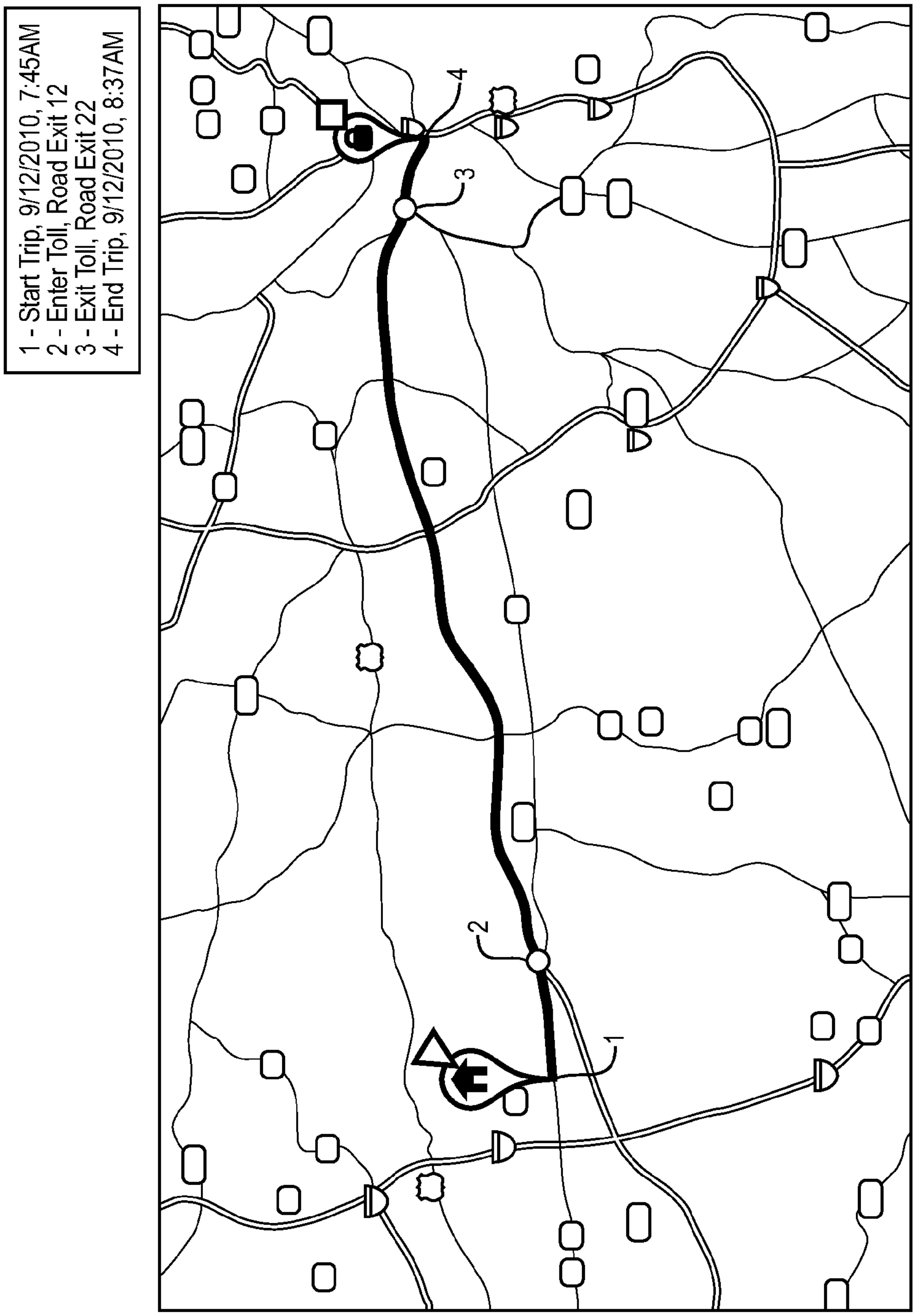
FIG. 6 shows a user interface displaying a trip on a map.

This invention may be used, in some instantiations, for obtaining business expense data based on the geographic location of the business that provided the product or service for which the expense was incurred. A GPS tracking device can correlate locations with cost-events such as tolls or parking by situating the vehicle at one of these locations within the bounds of an expansible trip. FIG. 6 shows a display of a trip on a map, in an instantiation of this invention. A driver starts a trip at [1] and enters the tollway at [2]. On this map, this is exit 12 on route 90 in Massachusetts. After 22 miles, the driver exits the tollway at [3] at exit 22 and arrives at destination [4]. The destination has been marked as "client" so some or all of this trips' mileage is reimbursable. In addition to the mileage expense, the amount of the toll between exit 12 and exit 22 may be obtained from a third party website. This expense would be added to the expense report for this trip.

A similar example can be made for parking if a car is in a location that is correlated with a fee parking lot. If the location has been designated a client location, the parking fee can be added to an expense report.

The databases used to generate parking fees and toll amounts can come from a variety of sources such as government websites or private companies running the services. These databases can also be community generated and include an interface to allow users to make corrections and/or annotations about the fee structure or any other aspect of the service experience.

In some instantiations, this geo-located expense generation correlates location data with electronic financial records. For example, if a restaurant bill is paid with a credit card and occurs in an interval between the beginning and end of a business trip, this may increase the likelihood of this expense being for a business purpose. Similarly, tolls charged to electronic tolling systems can be separated into business or personal categories based on whether or not they occurred during business or personal travel.

In some instantiations of this invention, electronic records may be reconciled with GPS and OBD-II data in order to improve fuel efficiency accuracy, if the user buys gas with a card that permits electronic reporting of how much gas has been purchased at each transaction. This allows a calibration of the fuel efficiency calculated locally with data from the OBD-II port.

In some instantiations, this invention may be used for an automated rideshare introduction service. In these instantiations, a database of driving trips allows users to opt-in to a program where an algorithm finds groups of users who are making similar trips at similar times. The database can then offer all parties an introduction that can be accepted or denied. If more than one party consents, the website will provide an introduction so the parties can then work out the rideshare details. Private details are not revealed until both parties agree to share information. The algorithm brokers introduction in private without revealing anything about potential shares.

According to principles of this invention, an algorithm may be used to look for trips similar to the one made by a driver. "Similar" means starts and end within a certain distance and time as the trip shown. Users might additionally specify how much (if any) of a detour they would be willing to take to pick up or drop off someone who is along his or her route but not at an endpoint. For example, consider the trip displayed on a map in FIG. 6. The algorithm may look for similar trips taken by other vehicles.

Additionally this algorithm may look for an appropriate return trip. This return trip does not necessarily need to be with the same driver who initiated the trip.

In illustrative instantiations, this invention may be used to provide a public automotive performance database with user-selectable permissions. The EPA fuel economy estimates for a given car are often met with skepticism from users in terms of their ability to predict real-world fuel consumption as driven by actual users. A database of driving trips that can correlate actual fuel economy with automobile make, model, and year can much more accurately report how a car is likely to perform. Additionally, limiting the calculation to a specific region can increase the precision and relevance to a user. For example, a user may want to search for the average fuel economy of a 2008 Subaru Legacy in the greater Boston metro area. Because of Boston's climate, road conditions, and terrain, a given car may perform differently here than in another region.

In an exemplary implementation of this invention, individual drivers have full control over how much information they want to reveal about themselves when participating in these statistics. Some driver may, for example, write a review of their car and/or give others a means to contact them, either through the website via a username, or by posting an email address. This creates a means for car shoppers to connect with car owners and better understand what to expect from an automotive purchase.

In the example shown in FIG. 5, the web interface connected to the driving database could present this information to the public.

This invention may be used for social recognition of virtuous and/or optimal driving behavior according to a variety of metrics. For example, according to principles of this invention, the person who can get the best fuel efficiency from a given make/model/year of car in a given region can be designated the "Chauffer" of that class of car. In addition to social recognition, this person may also receive promotional items such as free oil change. "Chauffer" designation can be applied to a range of automotive classes and combinations such as "best fuel economy for model year 2005 in the Northeast" or "best fuel economy for Toyota Camry in Chicago". In addition to "Chauffer" designation by fuel economy, other driving parameters can be used. For example, the person who does the least braking and accelerating would get a designation as the most courteous or the safest driver.

In the example shown in FIG. 5, the web interface connected to the driving database may present this information to the public and allow a user to choose which contests to participate in.

Figure 7:
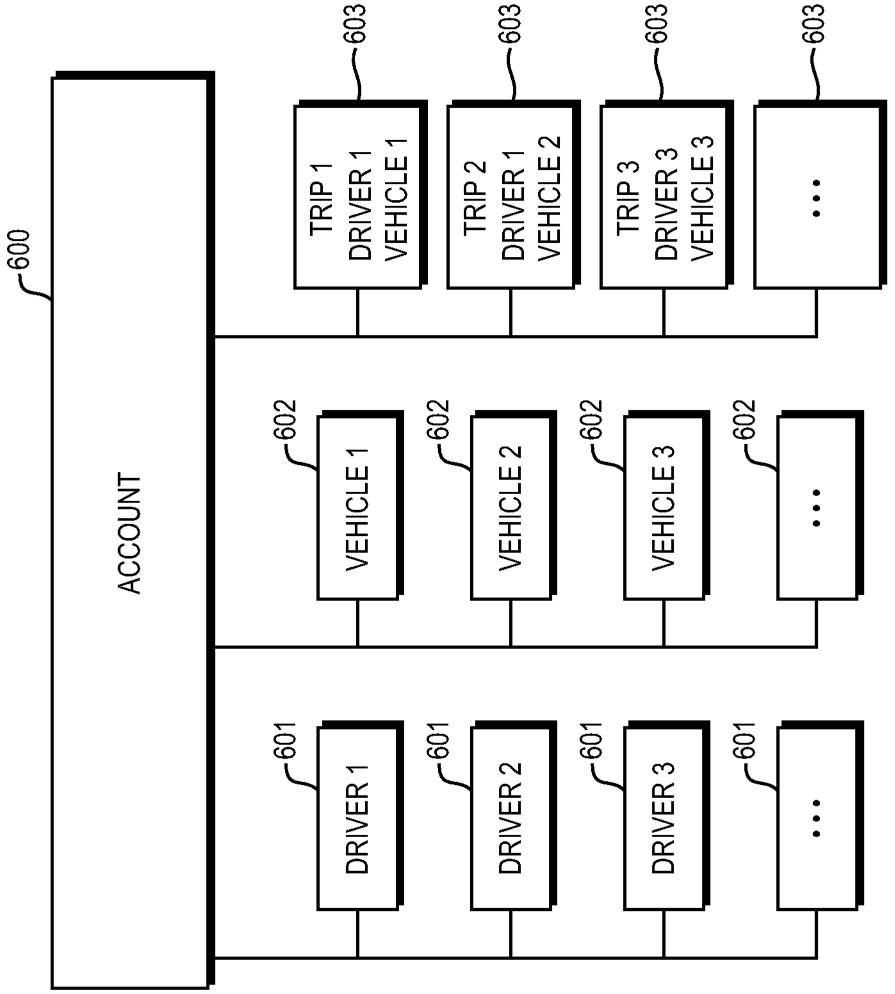
FIG. 7 shows a hierarchy of accounts, drivers, and vehicles in a database

FIG. 7 shows the data hierarchy in the database, in an illustrative implementation of this invention. The "account" [600] is the top-level container for a grouping of drivers [601], vehicles [602], and trips [603]. Typically, all vehicles in each account will have the same owner and all drivers in each account will be in the same family or have the same employer.

A trip [603] is defined as a discrete excursion by a specific driver [601] (if knowable) on a specific vehicle [602]. Trips start when the engine is turned on and trips end when the engine is turned off. Alternately, trips less than a few minutes apart are treated as a single trip, so that stops for refueling or bathroom breaks do not create separate trips. In some instantiations, a user interface allows users to manually merge or split trips.

In the example in FIG. 7, each account has an arbitrary number of drivers and vehicles. Each vehicle and driver has a profile that is illustrated below. Each trip taken by any vehicle is recorded to the database. Trips are associated with a vehicle through the OBD Accessory ID. Trips can be associated with a driver by the use of electronic tagging (e.g. RFID), or manually by editing trip info on the website.

In some instantiations, the method of electronically tagging drivers is globally unique, so that a given driver may be recognized by the database to drive a car under a different account. For example, this may happen if a driver rents a car from a rental agency.

In the example in FIG. 7, only the account holder can see data in the account. Alternately, additional user interfaces grant multiple drivers some or all privileges to view and/or edit data in the account. For example, the account holder may not even be a driver on this or any account.

Figure 8:
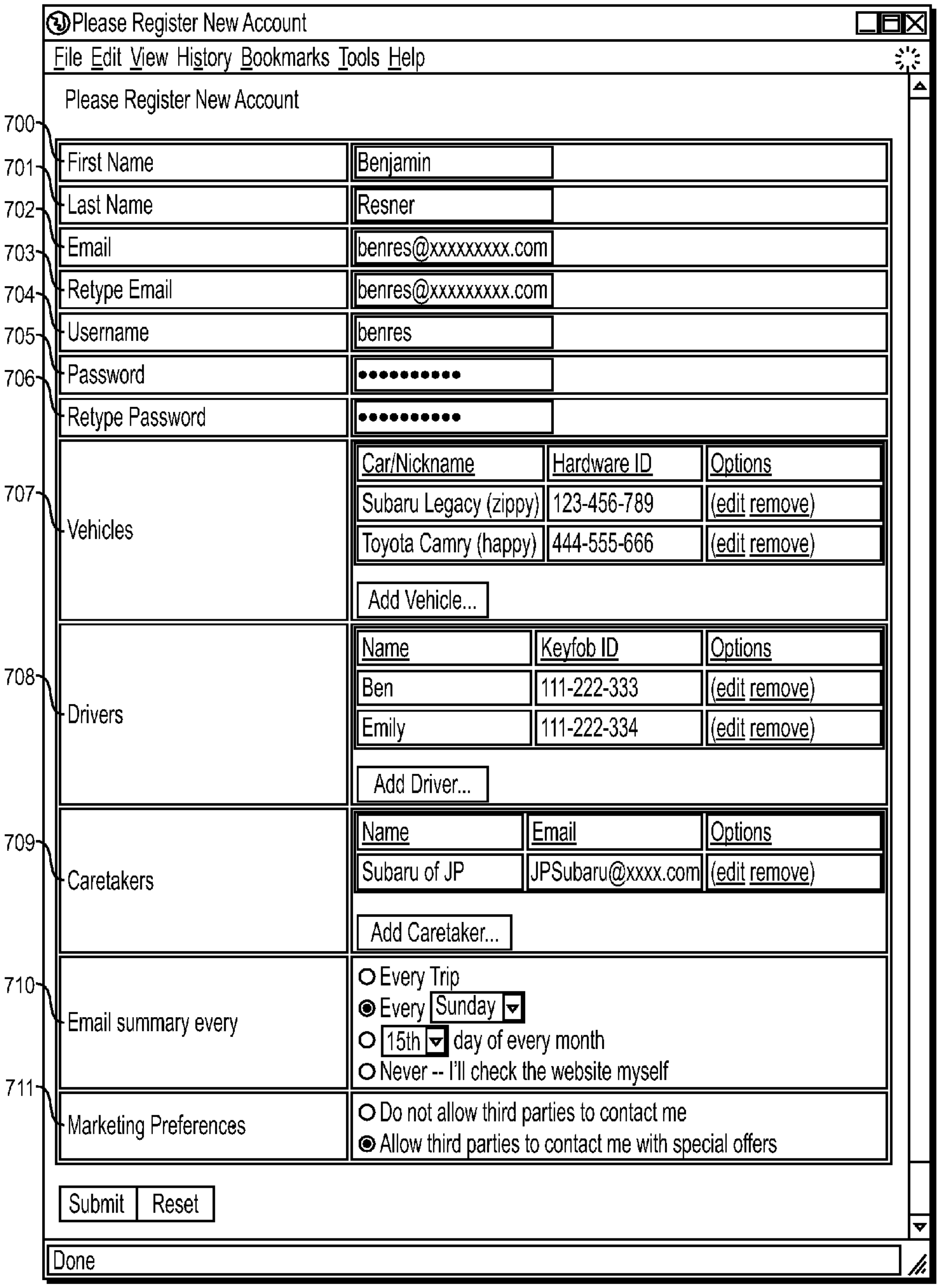
FIG. 8 shows an example of a web page to register and edit an account

FIG. 8 shows an example of a web page to register and edit a vehicle profile, in an illustrative implementation of this invention. The account holder enters his or her first and last name [700], [701], email [702], [703], and selects a unique username and password [705], [706]. Account holders are asked to pick a new username if the one selected is taken. Account holders are also asked to redo this page if email addresses or passwords do not match. Accounts contain one or more Vehicles [707], Drivers [708], all of which can be added, removed, and edited via links on this page. Adding a vehicle shows the web page in FIG. 9, and adding a driver shows the web page in FIG. 10.

Accounts also contain one or more caretakers [709]. A caretaker is person or entity who has responsibility to maintain the car but is not necessarily an actual driver. Caretakers are given partial or full access to services and content available to the account holder. For example, a mechanic or dealership may act as a caretaker and monitor trip data. The caretaker can then alert the account holder and/or individual drivers of situations that require attention. Examples may be poor fuel economy or a reminder the vehicle is due for a 3000-mile oil-change or dealer recommended servicing. If the malfunction indicator light (MIL) turns on, the caretaker can immediately be informed. Monitoring by a caretaker can be automated or performed by a human operator.

If the OBD hardware accessory includes a GPS, a full-service caretaker can dispatch a mobile team to service the vehicle without disturbing the user. This service includes both unscheduled repairs and scheduled maintenance such as oil changes or tune-ups.

The account holder also specifies how often he or she wished to be emailed a summary of all vehicles in the account [710]. The account holder can be emailed every trip, once a week on a designated day of the week, once a month on a designated day of the month, or not at all.

Finally, the account holder specifies if it is acceptable for third parties to contact him or her with special offers that may be of interest [711]. For example, a mechanic may offer a coupon for an oil change. Selling customer data to third parties is a possible revenue source and may offset the cost of providing services.

Figure 9:
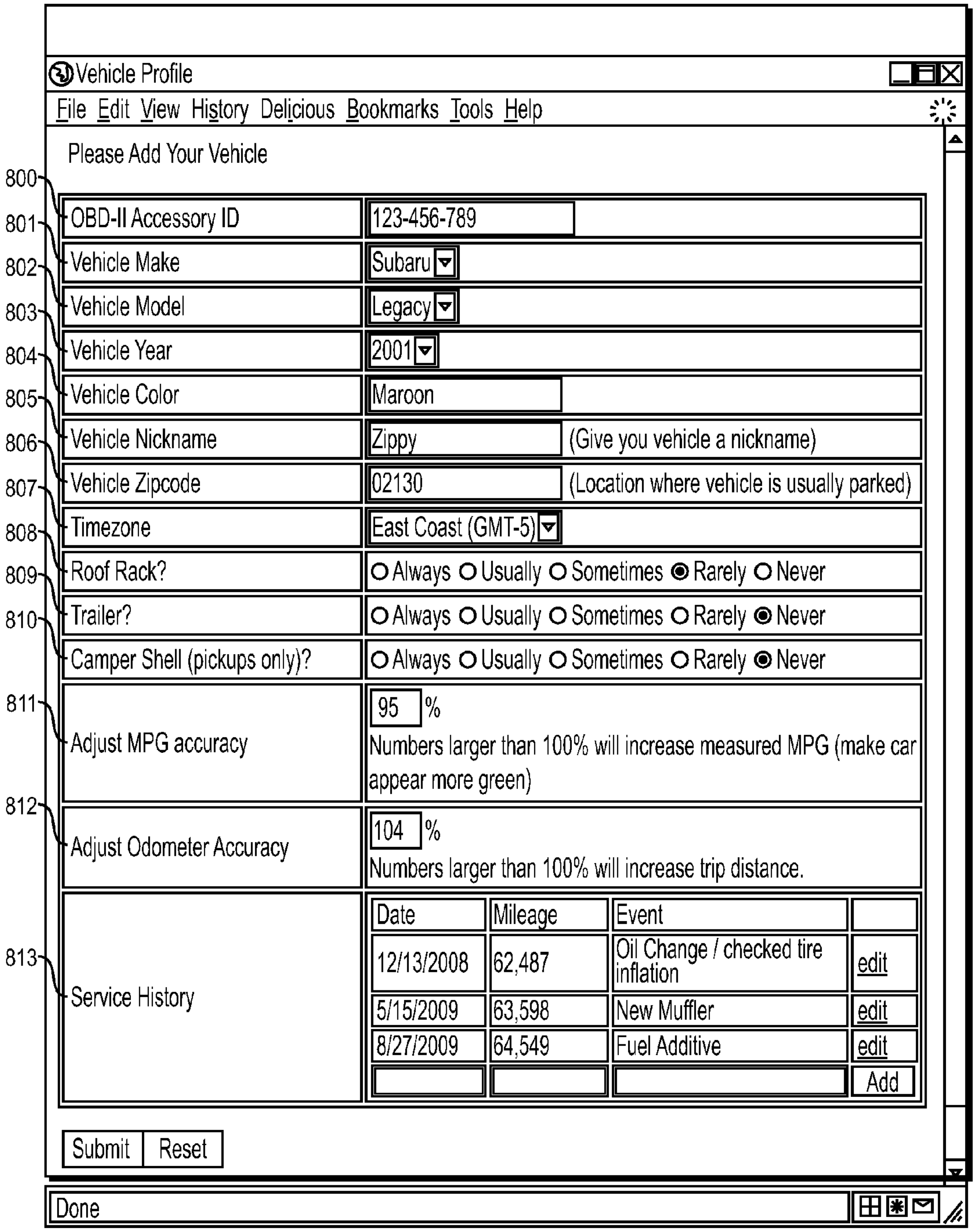
FIG. 9 shows an example of a web page to register and edit a vehicle profile
Figure 10:
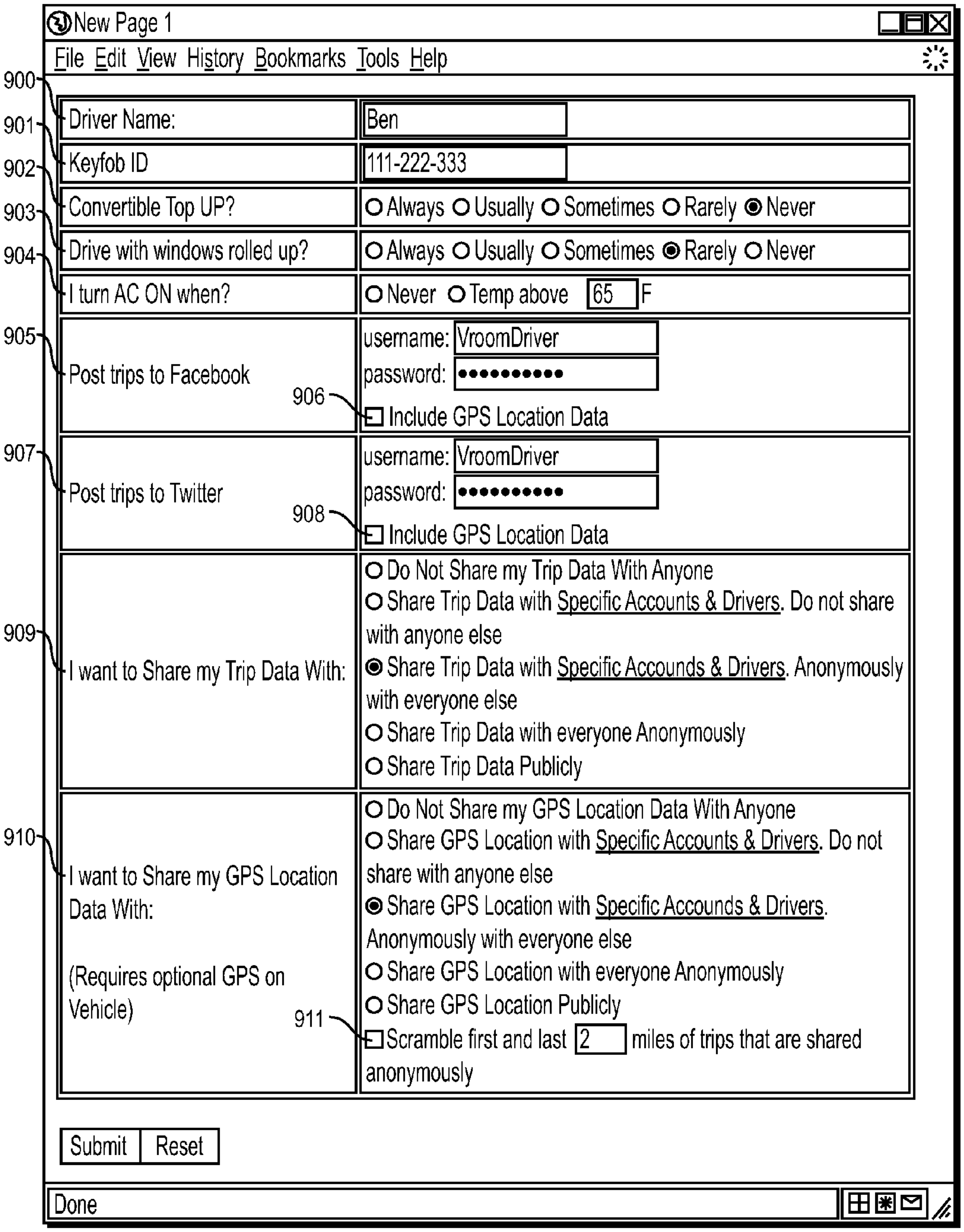
FIG. 10 shows an example of a web page to register and edit a driver profile

FIG. 9 is a web page to register and edit a vehicle profile, in an illustrative implementation of this invention. Each registered vehicle has an OBD hardware accessory for automatic logging. The unique Accessory ID printed on the hardware accessory is entered in the web page so incoming data can be correlated with a specific vehicle [800]. Alternately, users may manually enter trip data, for example, using any of the mileage scanning tools described in the introduction.

Users enter the manufacturer [801], model [802], and year [803] of the vehicle. Users are also asked to enter their vehicle's color [804] and give a nickname for their car [805]. These are useful for users to differentiate multiple cars. Additionally, vehicle color may also be correlated with lower fuel expenses in the summer due to reduce air conditioning.

Users enter the zipcode or location where the vehicle typically starts and/or ends its journeys [806]. This location is used when comparing trip data with other drivers and vehicles that operate in the vicinity of this vehicle.

Users also enter their local timezone [807] so trip data can be displayed according to local time.

If the OBD hardware accessory is not reporting accurate fuel efficiency, this can be adjusted manually [811]. Alternately, if the user purchases all gas with a known set of credit cards, gas purchases may be tracked and fuel economy estimated from odometer readings (if available on OBD hardware). This can also be used to judge the accuracy of the fuel economy readings available from the OBD hardware.

Similarly, the user can adjust the odometer reading [812] if the recorded trip length does not match with the length as computed on a map [1154] either via manual entry or automatic entry with a GPS. It can generally be assumed that GPS and map measurements are more accurate than vehicular odometer readings derived from measuring wheel rotational speed. The interface shown here requires the user to manually calibrate the odometer. Alternately, this calibration may be done automatically. In some instantiations, a user may apply odometer calibration to all trips past and future, or just to future or past trips.

Users or authorized caretakers can also add, delete, and edit the service history of their car [813]. This allows data to be correlated with specific events such as a tune-up or adding fuel injector cleaner to the gas tank. Many mechanics and dealers already maintain electronic databases of vehicle service history. In some instantiations of the present invention, a host services computer for the website receives and processes data from these databases.

FIG. 9 shows a web page to register and edit a driver profile, in an illustrative implementation of this invention. Each driver enters his or her name [900] and the keyfob ID [901] if available. As previously discussed, this "Kefob ID" can be any means of electronic tagging to automatically detect which driver is operating the vehicle.

The driver then answers some questions about his or her driving habits [902][903][904] that impact fuel economy. On some newer cars, at least part of this information may be obtained through the OBD connector, in which case, it can be automatically included in the trip log.

Drivers can choose to post their driving behavior on social networking sites such as Facebook® [905] and Twitter® [907], or a RSS feed (not shown). Users can also choose whether or not to include GPS location data in these posts [906], [908]. Users must enter their username and password to enable this website to connect to their Twitter® or Facebook® accounts. Users can be given advanced settings (not shown) that control in more detail the frequency and detail of the shared data.

Additional parameters can be specified to determine when and how to share individual and summarized trip data. For example, the user may choose to only share trips above or below a certain individual or group mileage.

In this example, drivers are given five choices for how to share their non-GPS trip data [909]: (1) Do Not Share my Trip Data With Anyone: Data is stored in the database but not available for viewing or comparison by other drivers. This setting offers maximum privacy; (2) Share Trip Data with Specific Accounts/Drivers, Do not share with anyone else: Data can be shared with specified users of the website. The interface for adding users who can view data is not shown. Data is totally private to all other users. Users do not necessarily need to register a vehicle to see this data; (3) Share Trip Data with Specific People, Anonymously with everyone else: Data can be shared with specified users of the website and anonymously with everyone else. Anonymous sharing means other users can compare their trip data with this user's trip data, but they cannot see who this user is, or contact this user; (4) Share Driving Data with everyone Anonymously: All users of this website can compare their trip data with this user but they do not know who this user is or how to contact this user; (5) Share Driving Data Publicly. All users of this website can compare their trip data with this user and contact this user. Users may want to do this out of pride, or to meet other users of the same car and/or share driving tips for optimal mileage.

Drivers are given similar choices for sharing any GPS location data associated with a trip [910]. Generation of GPS location data requires GPS hardware.

Users who want to anonymously share GPS data can choose to scramble the start and end of their trips [911]. This prevents third parties from inferring the user's identity by their location.

In some instantiations, user interfaces are added to create additional levels of sharing. For example, a driver may be willing to share aggregate city/highway fuel economy of his or her vehicle, but not share individual trip data. Comparisons to other drivers are more useful if more drivers choose to share their data, so it is important to find the right balance of privacy, complexity, and community.

Figure 11A:
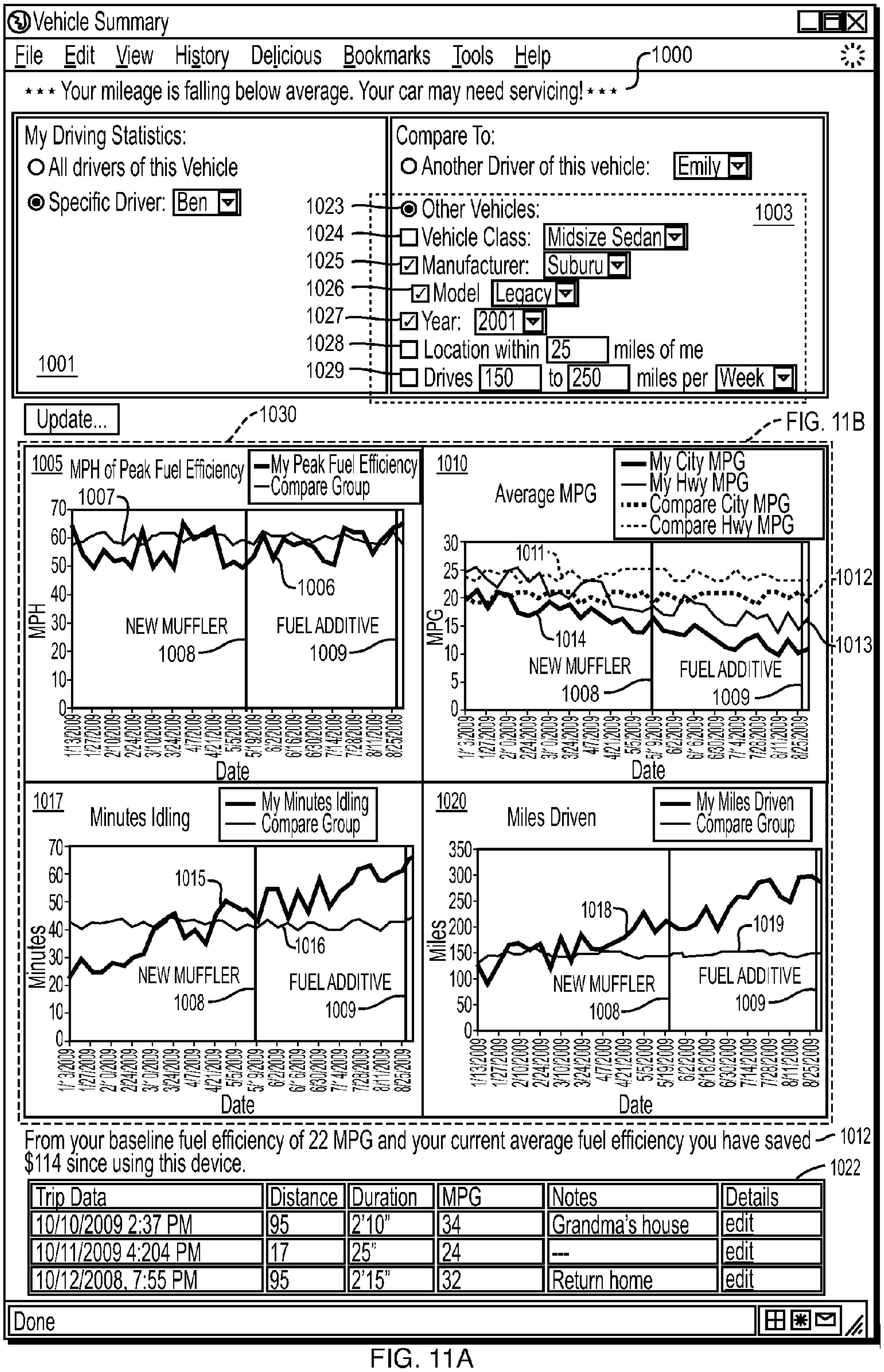
FIG. 11A shows an example of a web page displaying and comparing summarized trip data.
Figure 11B:
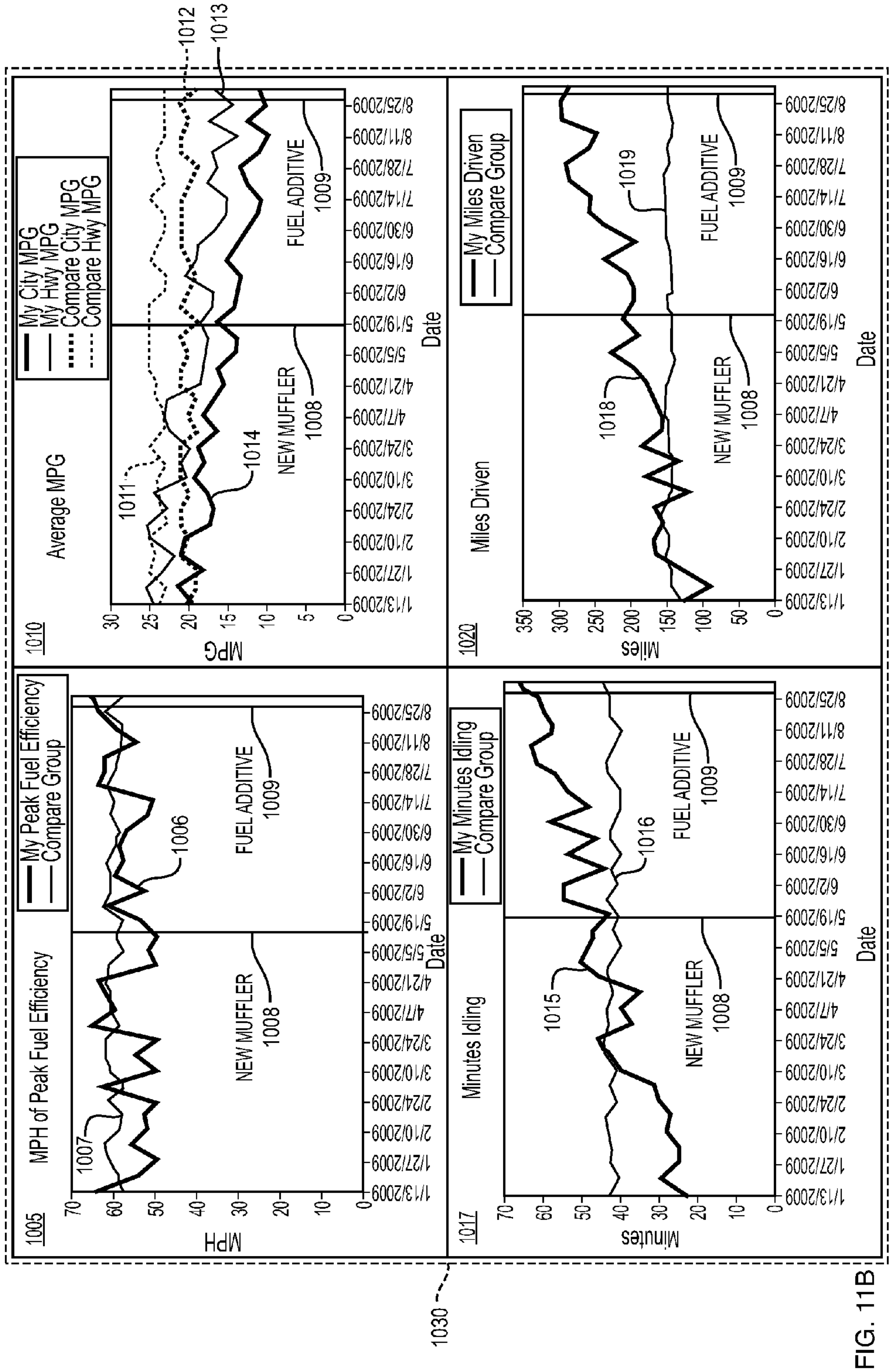
FIG. 11B shows an enlarged view of graphs in FIG. 11A.

FIG. 11A shows a web page of trip data and analysis (as well as tools to compare driving and vehicle performance to that of peer drivers and vehicles), in an illustrative implementation of this invention. FIG. 11B is an enlarged view of the graphs [1030] shown in FIG. 11A in an illustrative implementation of this invention.

At the top of the page are any alerts [1000] that require more immediate attention. In this example, the user is being alerted that mileage has fallen below average. Other alerts include trouble codes that cause the malfunction indictor light to turn on.

The user can not only view statistics for his or her vehicle [1001], but compare to another driver of the same vehicle [1002] or compare to other vehicles [1003] by clicking on the appropriate radio button [1023]. The interface for comparing to other vehicles allows for several filters for comparison. This includes vehicle class [1024] (e.g. compact sedan, mid-size sedan, full-size sedan, compact SUV, full-size SUV, minivan, pickup), manufacturer [1025], model year [1026], location within a certain distance [1028] of the registered zipcode [806] and the amount driven per selected time period (day, week, month, year) [1029]. Once users have made their selection, they press the "update" button [1004] to redisplay the results.

In this example, four graphs [1030] show a visual representation of the data request. This data can also be presented in tabular format (not shown) with each graph stacked on top of each other. The upper left graph shows the speed in miles per hour at which the vehicle obtains peak fuel efficiency. This will be different for different vehicles and is affected by amount of weight in the car and aereodynamic drag caused by accessories such as a roof rack. Users should try to drive at this speed for peak fuel efficiency. Line [1006] shows the user's speed of peak fuel efficiency and line [1007] shows the average for the comparison set of vehicles. The graph is also marked with the "New Muffler" [1008] and "Fuel Additive" [1009] events recorded in the service history [813] for ready visual analysis.

The upper right graph [1010] shows the average city and highway fuel economy in miles per gallon. The top line [1011] shows highway fuel economy for the compare group, the second line [1012] shows city fuel economy for the compare group, the third line [1013] shows highway fuel economy for the user's vehicle, and the fourth line [1014] shows city fuel economy for the user's vehicle. Similar to the previous graph, this is marked with events [1008][1009] from the service history [813]. As can be seen, fuel economy for this vehicle is below average and dropping. This is what triggered the warning message at the top of this page [1000].

The lower-left graph [1017] shows the number of minutes spend idling. One line [1015] show the number of minutes the driver has spent idling, while the other line [1016] shows the number of minutes spend idling by the comparison group.

The lower right graph [1020] shows the number of miles driven. One line [1018] shows the driver's number of miles and the other line [1019] shows the miles driven by the comparison group.

For all graphs, the x-axis is marked with dates. These graphs all start Jan. 13, 2009 and end at Sep. 1, 2009. Alternately, an interface may allow users to view a longer or shorter time period.

Other forms of data analysis that can be shown in graphs or tables include: (1) number of instances of idling lasting over a user selectable time; (2) quantity of fuel used, displayed in volume (e.g. gallons or liters) or in cost, using average regional fuel prices (in some instantiations, these prices are obtained from a publicly available database); (3). Amount of acceleration and deceleration: Excessive acceleration typically reduces fuel economy so measuring this might help drivers increase mileage, (4) displays of other parameters obtainable from the OBD interface, such as engine temperature, revolutions per minute, throttle position, and/or amount of gas in the tank.

Figure 12A:
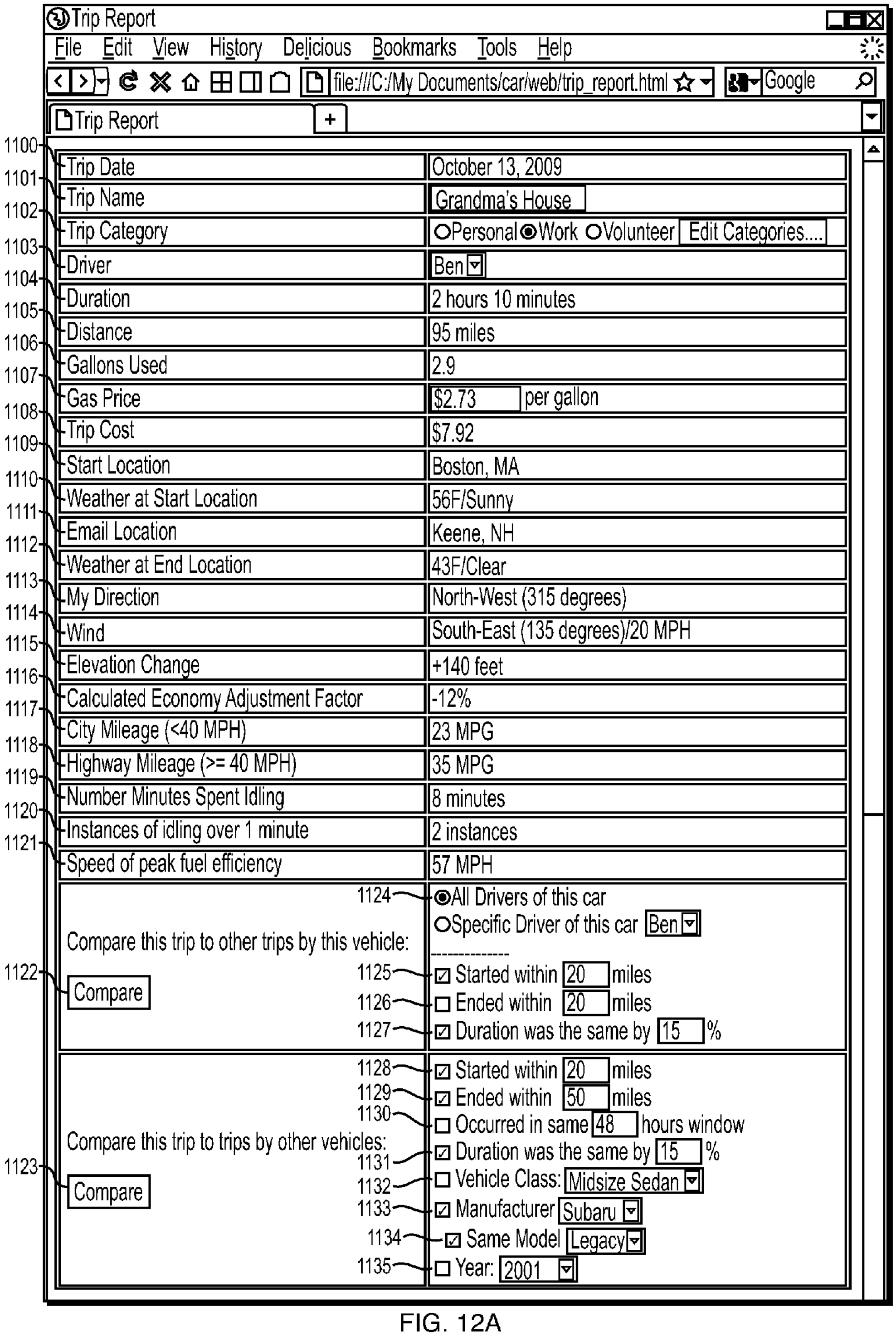
FIGS. 12A and 12B show an example of a web page rendering trip details

At the bottom of the page is a summary of money saved based on the fuel economy when the OBD hardware accessory was first installed [1021]. Also presented is a list of all trips [1022] taken by this vehicle. FIG. 12A shows the interface presented when the user clicks on an "edit" link for a specific trip.

A well-populated database of vehicular trips provides a wealth of opportunities for data analysis. The examples shown here are by no means exhaustive.

Note this web page can also be the content of an email that is periodically sent per preferences set by the user in the Account Profile page. In practice many users may not want this much detail and a configuration will be made available allowing users to see all pertinent driving info summarized in a few lines of text and some simple graphics, perhaps with color coding.

Figure 12B:
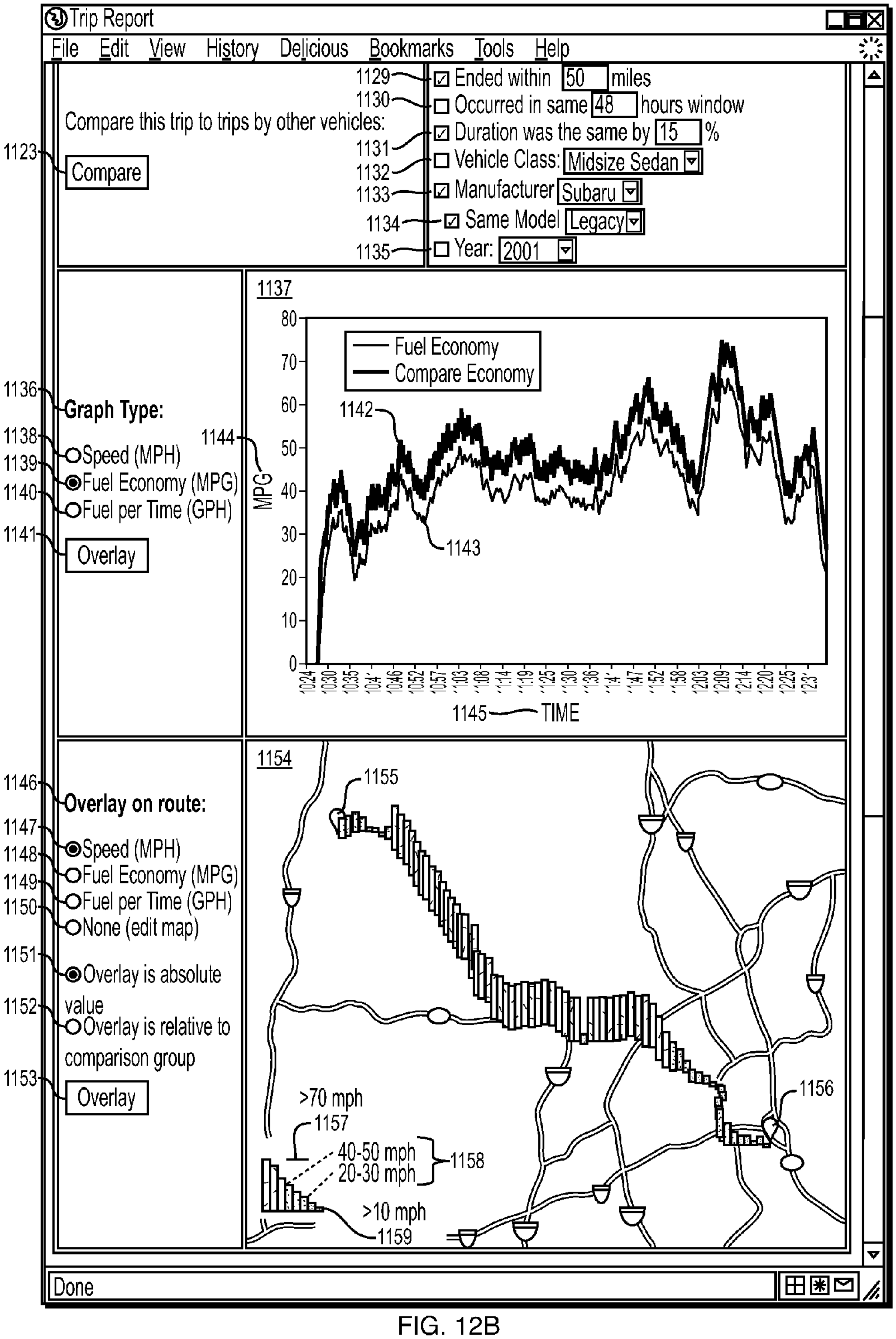

FIGS. 12A and 12B are the top and bottom of a web page, in an illustrative implementation of this invention. The web page shows an individual trip report with the following information: (1) Trip date [1100]. Date and time the trip started; 2) Trip Name [1101]. User-defined label for this trip. This appears in the trip summary [1022]; (3) Trip Category [1102]. User-defined categories for this trip. Tagging trips for "work" or "personal" enables creation of expense reports. Examples of how this trip categorization can be done include: (a) Interacting with a local interface attached to the OBD-II hardware accessory. This preference is written to the log and uploaded with other trip data, (b) Manually by the driver by visiting the website. This interface can also be used to change any selection made via a local interface on the hardware device, (c) Setting up rules such as "all weekday non-holiday trips between 10:00 AM and 4:00 PM are for work, and all other trips are personal". The categories are user-editable so drivers can differentiate between jobs or sub-tasks within a job. An interface (not shown) may be used for creating summary reports. For example "Create list of distance traveled, fuel used, and cost of fuel for all trips labeled "work" for the month of October 2009. Generation and distribution of these trips can be automatic or manual; (4) Driver [1103]. This is automatically filled in if the driver is known by some means of electronic tagging. Otherwise users may manually select the driver from the drop-down menu; (5) Duration [1104]. Length of time the trip lasted; (6) Distance [1105]. Distance the vehicle traveled on this trip; (7) Gallons used [1106]. Quantity of fuel used on this trip; (8) Gas Price [1107]. This is automatically filled in with the average regional cost of gas. The user can edit this amount if they pay more or less for gas. Additionally, if this is electronically linked to the transactional activity for one or more credit cards or gas cards, the amount the user actually pays for gas may be automatically entered; (9) Trip Cost [1108]. Trip cost is the (amount of gas used) times (cost of gas); (10) Start Location [1109]. If location is known, this is the start location of the trip. Location can come from a GPS accessory in the OBD hardware accessory, or the user can manually enter the start [1155], end [1156], and route of the trip; (11) Weather At Start Location [1110]. Weather at start location at time of start of trip. If location is not known, this is the weather at the vehicle's registered location [806]. Current, forecast, and historical weather data is available from the National Weather Service of Washington D.C.; (12) End Location [1111]; (13) Weather at End Location [1112]; (14) My direction [1113]. Simple calculation of direction traveled between start and end locations; (15) Wind [1114]. Average wind direction for duration of trip; (16) Elevation Change [1115]. Change in elevation between start and end of trip; (17) Calculated Economy Adjustment Factor [1116]. This is a computation that takes into account head/tail wind as well as elevation change and calculates an expected deviation from average gas mileage. Trips that are uphill and/or have a headwind will be negative and trips that are downhill and/or tailwind will be positive. Averaged over all trips, this factor should be zero; (18) City Mileage [1117]. Fuel economy when driving under 40 miles per hour. It is straightforward to change the 40 MPH to a user-settable amount; (19) Highway mileage [1118]. Fuel economy when driving 40 miles per hour or above; (20) Number of Minutes Spent Idling [1119]. Total amount of time vehicle spend with a speed of zero; (21) Instances of idling over 1 minute [1120]. Total number of instances the vehicle had a continuously lasting speed of zero. The 1-minute time threshold can be user-adjustable; (22) Speed of peak fuel efficiency [1121]. Speed at which vehicle attained maximum fuel economy.

The trip report page also contains an interface for comparing this trip to one or more trips by this vehicle [1122] or other vehicles [1123].

If comparing trips to other trips by this same vehicle, the user has the option of comparing to all drivers of this vehicle or just one specific driver [1124]. Comparisons can also be filtered by start location [1125], end location [1126] or duration [1127].

If comparing trips to trips by other vehicles, the user has the option to filter comparisons by start location [1128], end location [1129], time period [1130], trip duration [1131], vehicle class [1132], vehicle manufacturer [1133], vehicle model [1134], and model year [1135]

Below this selection on the web page are visual representations of [1137][1154] of the chosen comparison. The first graph [1137] shows fuel economy in MPG [1144] as a function of time [1145]. The lower line [1143] shows the user's fuel economy and the upper line [1141] shows the fuel economy of the comparison group.

The user can change the graph type [1136] and choose between speed [1138], fuel economy [1139], and Fuel consumption per hour [1140]. It is also straightforward to give users the ability to change the x-axis from time [1145] to distance.

The lower graph [1154] shows the route as plotted on a map. If the OBD hardware accessory includes a GPS, this will be created automatically. Otherwise the user can manually enter the start [1156] and end [1155] location by clicking and dragging graphical endpoints on a map. The website will generate the optimal route between these endpoints and then the user can modify that route by dragging points along the route to new locations. When manually entering the map, the distance on the map may match the distance calculated by summing the individual speed readings multiplied by the sampling time interval. If these numbers are not suitably close, an error condition will be generated and the user may enter an odometer correction factor.

Manual trip entry also allows the database to reconstruct the location of access points as well as other logged events. Using the timestamped speed-readings from the trip log [401], the distance into a trip can be calculated for any given duration. Given the elapsed time between the start of the trip and connection to an access point allows the distance from the start along the user-entered route to be calculated within the accuracy of the vehicle's odometer. Multiple readings of the same access point with the same SSID can help increase location accuracy. Of course if the access point is moving, this will not work but algorithms can detect this situation.

The user can overlay trip data on top of the route [1146]. In this example, the user can choose between speed [1147], fuel economy [1148], fuel consumption [1149], or no overlay [1150]. When there is no overlay, the user can more easily edit the map because there are no additional visual elements to interfere with the click and drag operation.

Users can select the overlay to be an absolute value [1151] or a measure relative to the comparison group [1152]. In the example shown, the overlay is absolute speed in MPH. Taller bars represent faster travel. Color-coding reinforces this association, with red indicating travel under 20 MPH [1159], yellow indicating travel between 20-50 MPH [1158] and green being travel above 50 MPH [1157]. Of course it is possible for the color to encode an orthogonal parameter such as fuel economy instead of simply being a different way to encode speed.

Figure 13:
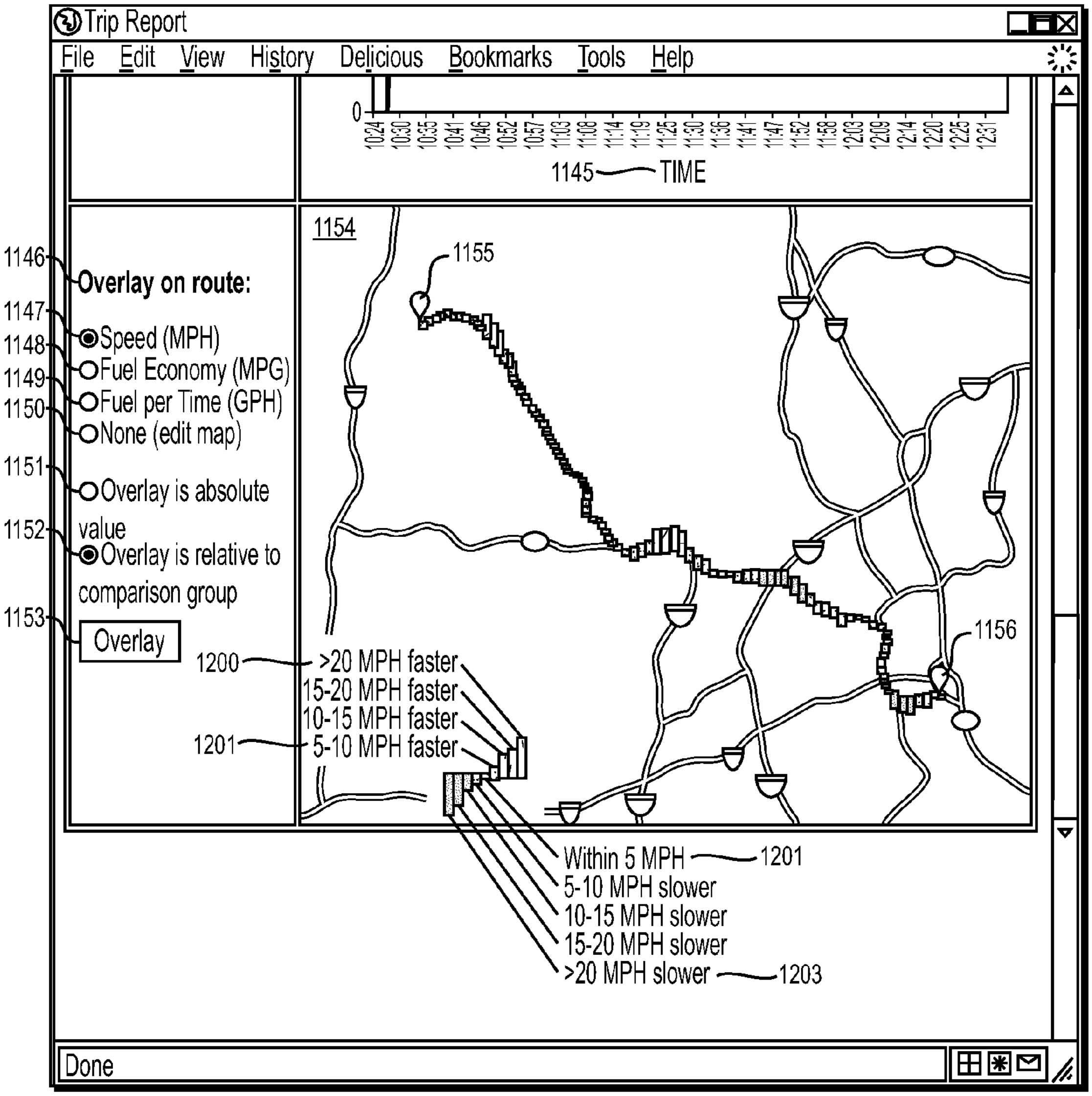
FIG. 13 shows an alternative way of plotting trip data on a map.

FIG. 13 is how the graph in [1154] appears, in an illustrative implementation of this invention. If the user chooses "Overlay Relative to Comparison Group" [1152] instead of "Overlay is Absolute" [1150]. Most of the graph is the same as in FIG. 12 but the green/yellow/red indicators show relative speed rather than absolute speed. When the user is traveling more than 15 MPH faster than the comparison group, the color is green [1203]; when the user is traveling within 15 miles of the comparison group, the color is yellow [1201], and when the user is traveling less than 15 miles of the comparison group, the color is red [1200]. Additionally, when the user is traveling faster than the comparison group, the bars rise above the route; when the user is traveling slower than the comparison group, the bars are below the route. When the user travels within 5 MPH of the comparison group, the bar is centered on the route.

Figure 14:
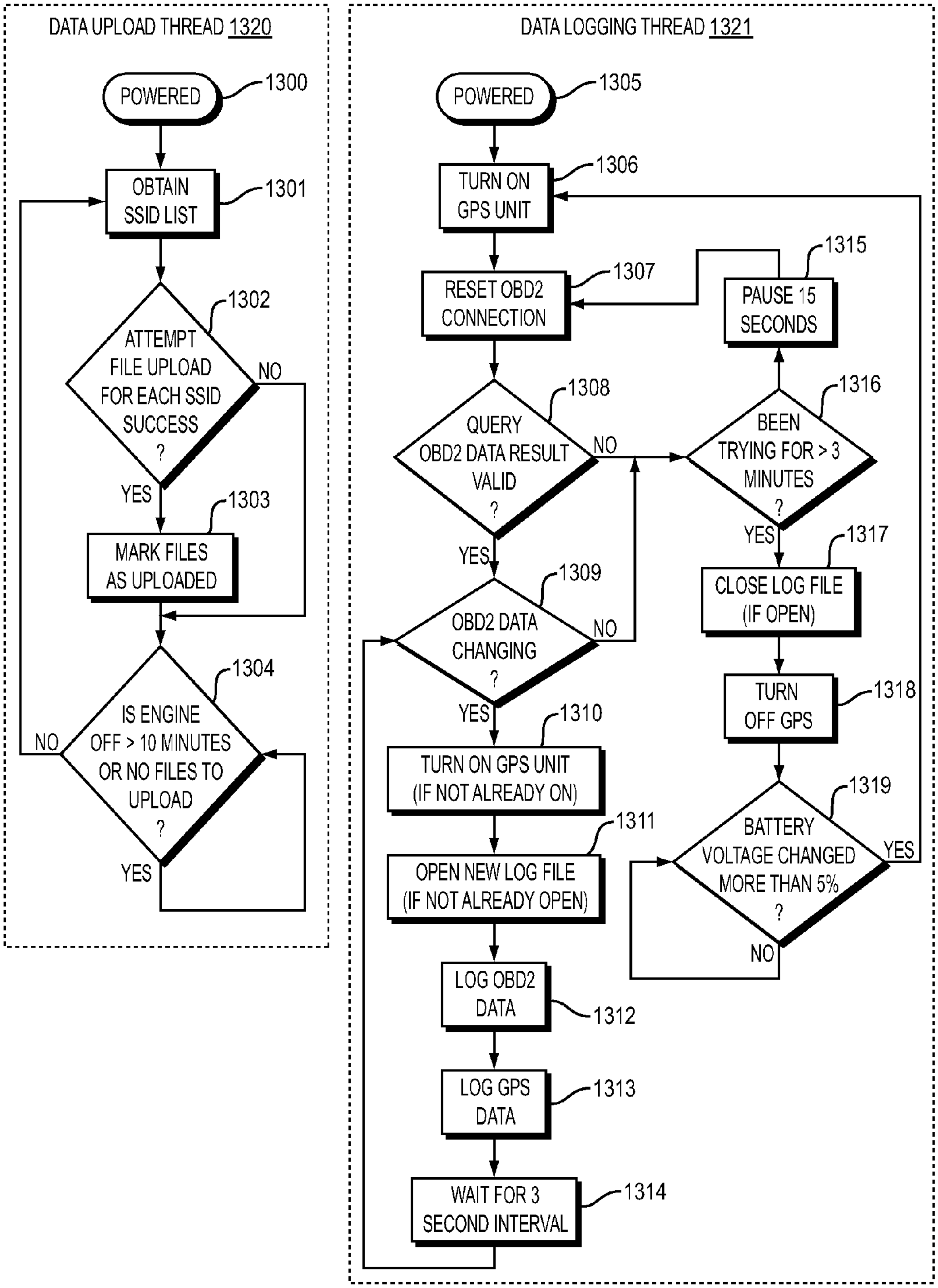
FIG. 14 shows an operational flowchart for an example hardware implementation.

FIG. 14 is a flowchart for the hardware accessory operational flow, in an illustrative implementation of this invention. The operational flow contains two threads. The Data Upload Thread [1320] is always searching for an Internet connection. It starts by scanning for all SSIDs [1301] from Internet access points in range. If any SSID matches any previously defined user-specified preferred SSID, these are used first, along with any stored passwords. If these preferred SSID are not available or not functioning, the software will attempt to connect to the next available unknown SSID.

Once a successful upload has been completed [1302] the files are marked as having been uploaded. This allows them to be overwritten by new files.

If the engine is still running and data is being logged [1304], the device continues this process of scanning for SSID and uploading data as it becomes available. If the engine is not running and there are no files to upload, the device enters a low-power sleep mode until the engine is started again and logging resumes.

In the example shown in FIG. 14, if the engine has stopped running but the hardware accessory has files to upload, it will continue attempting to do this for 10 minutes after the engine has stopped. If it has not been able to successfully connect to the Internet after 10 minutes, the thread becomes dormant until the engine is started. The files remain in non-volatile memory until connectivity is available. In other implementations, the hardware accessory can attempt to upload files while the car is running if appropriate connectivity is detected.

The Data Logging Thread [1321] logs GPS and OBD-II data. When the hardware accessory is first powered [1305], the GPS unit is activated [1306]. It can take time for the GPS to acquire a signal so it is desirable to power it on as soon as possible. It is also possible to periodically wake up the GPS so it may re-acquire a satellite fix and be ready when the car is started.

The OBD-II connection is then reset [1307] and an attempt is made to read data [1308]. If the data is valid (e.g. no timeout errors), it is logged [1312] along with any GPS data [1313]. The hardware accessory then waits for three seconds [1314] since the start of the previous frame and repeats the cycle. Depending on accuracy requirements balanced with bandwidth and storage constraints, this three second sampling rate can be increased decreased, or even dynamically set depending on driving behavior.

If the OBD-II data is not valid, or the OBD-II data is not changing [1309] this means the vehicle engine is not running. On some vehicles, the on-board computer continues to respond with data when the engine is turn OFF, but this data does not change. In other vehicles, the on-board computer will stop responding. Sensors such as the GPS or an accelerometer, or a analog to digital converter monitoring the car's battery voltage can also help determine if the car is running or not. When the hardware accessory determines the engine is no longer running, the hardware accessory will try to re-establish communication for another three minutes [1316] with a 15-second pause between each attempt. If the OBD-II port continues to be uncommunicative and/or the data does not change from the previous query, any open log file is closed [1317], the GPS unit is turned off to save power [1318] and this thread becomes dormant[1319].

When both threads are in low-power state, the overall power consumption of the hardware accessory is at the minimum value. In this low-power state, the vehicle battery voltage is scanned for abrupt changes that indicate activity such as the interior lights turning ON or the engine being started [1319]. Note that as cars make more internal data available, the determination of whether the engine is running can be made in a more straightforward manner.

As noted earlier, this invention may be implemented with a user interface that allows a user to classify trips as being for business or personal purposes. In other instantiations, other trip classifications may be used, e.g., "personal", "business", "charitable", "medical", "moving", "kids carpooling". In some instantiations, users may distinguish between different types of business. The latter becomes an issue if multiple entities are responsible for reimbursing different trips. Furthermore, different drivers of the same car might all have multiple entities reimbursing different trips. All the descriptions below should be understood to encompass all these more complex situations of multiple drivers with multiple expense reporting.

In some instantiations, the user or some other account administrator sets parameters to classify how, for example, trips between home and client are handled.

In some instantiations of this invention, the classification of endpoints is automated. In that case, users can use trip classification to generate expense reports. These expense reports automatically deduct the home-work distance from trips between "home" and "client" or secondary work sites. Other rules for transforming timestamped sets of GPS coordinates into expensible items can also be included. The trip reports may also include timestamps, GPS location data, gas used, duration, and other trip statistics.

In some instantiations, once a trip is classified, this may be shown on a map with color coding, fonts, or textures to show classification differences. For example, trips that are fully reimbursable (e.g. work to client) can be green, trips that are partially reimbursable (e.g. work to home) are yellow, and trips that are not reimbursable (home to personal) are shown in red. Also, for example, an online dashboard may summarize the number of trips that are for business and the corresponding size of the reimbursement. This helps the user anticipate the size of a reimbursement or tax deduction.

In some instantiations of this invention, a social network may be used to share information gathered by one or more the OBD and/or GPS units, for example to compare fuel economy and other driving statistics. Trip classification is another parameter users may choose to share with individuals, members of a community, or the public at large. For example, a user may advertise that 70% of his or her driving is reimbursable or he or she gets the best fuel economy for his or her class of vehicle.

This invention may implemented in such a way that hardware switches (such as shown in FIG. 1, [112]) may be used to accept user input regarding categorization of a trip (e.g., as being for business or personal). In FIG. 1, the user may push a button corresponding to "personal" if the trip was personal, and push a button corresponding to "business" if the trip was business. These selections may be recorded in the trip log as described in FIG. 4.

The drawing in FIG. 1 shows the switches as being push-buttons. But they can alternatively be a toggle, slide, rotary or any other electro-mechanical sensing device that allows for user input. Furthermore, the switch may be part of the hardware unit or external with a wired or wireless communication between the switching accessory and the hardware unit. In the latter case, the switches may, for example, be mounted on the steering column or integrated into the dashboard where they are more readily accessible to the driver.

Figure 15:
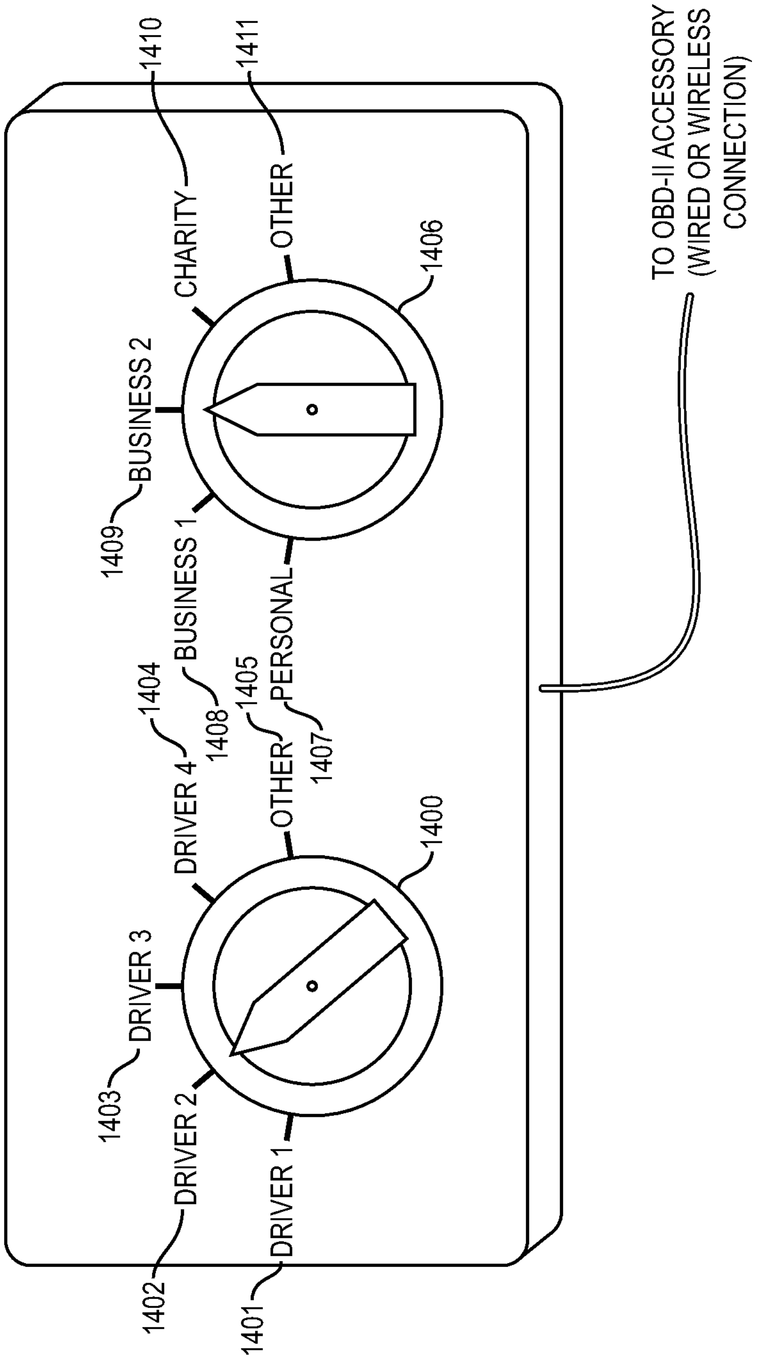
FIG. 15 shows dials which may used to input user selections.

FIG. 15 shows an example of a more complex electro-mechanical switch, which can handle multiple drivers making trips with multiple classifications, in an illustrative implementation of this invention. The position of the rotary switch will be stored in the driving log described in FIG. 4. Item [406] shows the log recording the driver. The state of the trip classification settings can be added to this description.

In some instantiations, when the trip is uploaded to the server, the server classifies the trip according to the switch settings. Server-side rules are used to disambiguate trips where the switch setting was changed mid-trip. In most situations, the trip may be classified according to the switch settings when the trip was completed. This allows the driver to update switch settings mid-trip in the case where he or she forgot to properly set the trip classification switches as the beginning of the trip. But other classifications are possible such as pro-rating trips according to the percentage of time, distance, or fuel used in a given portion of each trip classification. This last example requires the user to update switch settings in a very timely manner.

In some implementations of this invention, the "switch" may also be entirely virtualized on software—for example an application running on a cellphone that communicates via short-range RF with the hardware accessory and records the trip classification as if it had come from the electro-mechanical input described above. In this setup, the switch settings are written to the log and uploaded to the server in the same manner as an actual electro-mechanical switch.

In some implementations, the cellphone may also communicate directly with the database server. A timestamp on the switch manipulation may correlate with timestamps on the trip data recorded by the OBD-II accessory to classify the trip. For example, the cellphone app may upload a packet that says "The trip at 4:15 PM by driver 1234-5678-9012-3456 on May 16, 2008 GMT is for business". When the OBD-II accessory uploads a trip by the same user that spans 4:15 PM on May 16, 2008 GMT, the server searches for classifications and if one is found, it knows how to classify this trip. This application depends on both the cellphone and the OBD-II accessory accessing a synchronized internal or external time source.

In some implementations of this invention, the server software may also communicate with the user's online calendar and use any classification available to give trips a designation. For example, if the user has classified an appointment that spans 4:15 PM on May 16, 2008 as "business" the server may automatically classify a trip occurring at that time as business. This is similar to the cellphone app described above sending a timestamped trip designation to the server. In the case of the online calendar, the source is the user's calendar entry. In the case of the cellphone app, the source is the user's manual input. But to the server, both contain the information to correlate a given trip by a given user at a given time with a given classification.

In some instantiations, trips can be classified according to a set of rules. For example trips that start or end at a designated location can be automatically classified as a certain type. Additionally, trips that start or end within a certain time interval can be assigned a given classification. These rules may be configurable through a web page or other electronic media.

Here are some examples of rules that may be used, in illustrative implementations of this invention: (1) All trips that start or end at one or more designated locations (e.g. "home" or "main office") are given a specific classification; (2) Trips with endpoints of a given classification have that classification applied to all future trips to that endpoint automatically; (3) All trips that start or end between a given time interval are given a specific classification. For example, trips that start on non-holiday weekdays between the hours of 9:00 AM and 5:00 PM are classified as "business". In this example, a database of "holidays" are required. This database can specify both federal holidays as well as local holidays such as "Patriots' Day" celebrated in Massachusetts and Maine. GPS coordinates or user-specified preferences determine the local application of "holiday". For example, if the GPS shows the user in Massachusetts, then Patriots' Day is applied.

In exemplary instantiations of this invention: Users can always override rules, either for a single instance or for all instances that match some subset of rules. For example, this may allow for a trip on a weekend to be classified as "business" as necessary. Rules may be applied in hierarchical manner in the case of a conflict—for example a trip may occur during "business" hours to a "personal" location such as a supermarket or gym. A precedence ordering may determine which rule dominates. Alternatively, these trips can be flagged for manual classification by the user.

In some instantiations, the GPS unit on the OBD-II accessory can be used to automatically infer additional expenses associated with driving. If a trip is classified as business, these additional expenses become part of the reimbursable expense report.

This invention may be implemented in such a way that a database of parking garage locations and hourly rates allows the server to infer parking fees associated with a trip. For example, if the car is parked at a paid parking garage for 2½ hours, the server may automatically add appropriate parking fees to the trip's cost. Because many accountants and IRS jurisdictions require a printed receipt, the server may prompt the user for such a receipt with a given amount on a given day.

A simple implementation may only know the location of parking garages but not have access to the fee structure. In this case, the server may only remind users of the existence of parking changes but not be able to calculate costs.

In some instantiations, the parking lot database may be acquired from third parties or data gathered for it by user input. When a sufficient sampling of users marks a given location as being a "Parking Garage", this location becomes classified as such for ALL users and all users are reminded of such parking fees. More involved users might even enter the fee structure and this too can become available to all users to both verify and utilize in determining reimbursements.

In some instantiations, the server communicates electronically with the a third party and correlates the parking charge with the GPS location data.

Similar to parking, tolls are a location-correlated expense that can be automatically added to a trip based on GPS coordinates. Most tolls are a fixed fee associated with passing through a given toll gate. But many turnpikes or highways charge tolls when exiting the tollway based on distance travelled. In some instantiations of this invention, these tolls can be automatically calculated based either on acquisition of a database, via user-entered content, or communication with the user's credit card company.

In some instantiations, this invention correlates vehicular stops with gas station locations. Some existing websites contain the geographical locations and prices of gas stations across the United States and Canada. Correlating vehicular stops with gas station locations can help drivers record money spent on gas. Additionally, some cars provide the number of gallons in the gas tank through the OBD-II port. In these cars, the actual amount of gas can be recorded. Stops at gas stations can be correlated with credit card transactional activity for a precise recording of money spent along with a receipt.

There are reasons to stop at a gas station other than buying gas—for example to buy a snack or take a rest. For cars that report fuel-tank level through the OBD-II port, this invention can be implemented to use the absence of change in fuel-tank level to filter out these false-positives. For cars without this functionality, this invention may use some other data such as a credit card transaction or manual input to confirm whether and how much gasoline was purchased.

This invention may be implemented in such a way that a database of trip data may be accessed for different purposes. Among other things, different apps may be used to create portals into this data that are targeted for a specific audience. As used herein, an "app" means computer code (and, in some cases, graphic arts elements such as JPG or GIF files) that can access individual and group user data per allowable permissions and format the data. For example, such computer code may be compiled or interpreted.

In some implementations of this invention, these apps are hosted on the same web server infrastructure holding the data. Alternately, they are deployed on external web servers. Here are seven examples of apps that may be employed, according to principles of this invention:

First, this invention may be implemented with an app for teen tracking Parents of teenagers wish to monitor their child's driving behavior. A teen tracking portal may highlight the number of preset speed violations, the number of starts and stops with an acceleration/de-acceleration above a preset limit, as well as any other parameter that indicates risky behavior. The app may also highlight visits to "off-limits" areas. Teenagers who are expected to share in family automotive expenses might be expected to reimburse their parents for trips on their car. This app may keep track of teenage miles driven and create an invoice for the teen to reimburse parents. This app encourages teens to conserve fuel by driving in a more responsible and restrained manner. It may also include a social networking component where trip statistics are shared with peers.

Second, this invention may be implemented with an app for insurance premium pricing. For example, in such an app, an OBD-II data logger keeps track not just of how many miles are being driven, but when and how. The "when" simply records the time of the trip. The "how" records sudden starts and stops similar to the "teen tracker" above. This data may be analyzed for patterns correlated with risk. The app may further allow the user to preview how their insurance rates may be affected by their historical driving patterns. This allows the user to test whether or not they may save money without having to reveal any personal data. If the user decides to share their driving data with an insurance company, the insurance company may analyze the driving data for patterns of risk and offer discounts as necessary. In this example, users can continue to preview rates among various insurance providers even if they decide to share their driving data with one particular company.

Third, this invention may be implemented with an app for persons focused on obtaining maximum fuel efficiency for a given car. For example, such an app may allow users to share driving data and may call attention to members who excel at a given metric.

Fourth, this invention may be implemented with an app for analyzing consumers going past or near a particular geographic location. Such an app may provide aggregate data to determine the profile of drivers proximate to a given location. The driving database allows site developers to know, for example, the make, model, year of vehicles passing within a preset distance of a given location, as well as the home zipcodes of those drivers. Additional demographic information about the driver may also be available as part of the online registration process. To the degree users are willing to share their driving details, additional information about individuals is also available.

Fifth, this invention may be implemented with an app for location-based advertising and other services. Driving habits are of great interest to businesses selling products or services. For example, if a user regularly drives between two points, a new or existing business located along that route may want to reach out to the driver and make available a discount or special offer. In some cases, such an app may offer drivers advertisements or coupons without having to reveal individual users. Business may specify criteria for the target audience and the database may communicate to drivers in that target category with the offer. For example a pizza delivery business may offer a free soda with delivery to all drivers who pass within two miles of the location more than four times per week and live in a given list of zipcodes. A trusted third-party auditor may verify the terms of the contract have been met.

Sixth, this invention may be implemented with an app for sharing driver and trip data through social networks. For example, such an app may allow users to "check in" at specific locations and both broadcast their location to approved friends. GPS coordinate data at trip endpoints may be part of this location ecosystem and automate the process of "checking in". Or, for example, such an app may automate how trips are posted to blogs and social networking sites such as Facebook and Twitter.

Seventh, this invention may be implemented with an app for carpooling or ride sharing. For example, a carpooling application works as an introduction service to enable people who make similar trips at similar times to find each other. The carpooling engine may look for similar trips/times and then offer to both parties the opportunity to meet each other. If both parties agree, the carpooling engine may act as an intermediary for them to share additional information without revealing any identifying information such as email address or real name. The parties can continue using the carpool engine as an intermediary or they can chose to share phone numbers and email addresses for more direct communication. Users do not need to manually enter any information about their trips. The matching is done automatically by analyzing trip data.

For example, when implemented with such an app, this invention may notify users 'A' and 'B' that they both drive from ¼ mile of location 'C' to ¼ miles of location 'D' within 10 minutes of each other. The exact thresholds for matching times and distances are software configurable. More specifically, "Alice" and "Bob" both travel from their work in the same building, to the same gym at 12:05 PM and return at 1:15 PM on Monday, Wednesday, and Friday. The carpool engine may notice this similarity and offer an introduction.

Such an app may allow drivers to publicize certain trips as "shareable" and invite others to join in the trip for free or for a fee. A corresponding database contains people who are looking for rides and possibly what they are willing to pay for the ride. Interested parties are notified if a match is found. Both drivers and riders can also browse the databases to see availability.

In some cases, such an app allows drivers can automatically make all trips "shareable", manually designate which trips are "shareable", or use rules to automatically designate a subset of trips "shareable". An example of this is to make all trips between "home" and "gym" shareable.

In some cases, such an app allows drivers to designate a subset of users to view different shareable trips. For example, a driver may only designate as "shareable" some or all trips with "family" or "co-workers". Also, for example, drivers may have control over how riders see data such as year/make/model/mileage of car, average speed, or number of sudden starts/stops. This data might be interesting to riders in order to evaluate risk factors associated with a given driver and vehicle. A rider may, for example, only filter out rides in cars that are over 10 years old, have over 100,000 miles, or are driven by drivers with statistically high-risk behaviors.

This invention may be used to advantage for WarDriving. As shown in FIG. 4, a log entry [407] records the SSID and geographical location of a WiFi access point used to upload the data payload for a given trip.

This invention may be implemented in such a way as to include not just logging of the access point used to upload the trip data, but continuous monitoring and logging of all access points along the route, as well as their geographical location, SSID, MAC address, signal strength, channel, protocol, error rate, and other identifying information. This data may be recorded in the log along with trip data and uploaded to the server along with the trip data. When this access point data is uploaded it may be used to populate databases correlating MAC addresses and other identifying characteristics with geographical location. As used herein, the term "WarDriving" means the activities described above in this grammatical paragraph."

A variety of publically available databases exist to share WarDriving data.

This invention may be implemented in such a way that it can be employed by ordinary users without any special knowledge or equipment. Advantageously, this may hasten widespread adoption of WarDriving by ordinary users. Because some embodiments of the present invention include a GPS and WiFi transceiver, this hardware can be used to WarDrive without any additional hardware cost. This invention may be implemented in such a way as to overcome reasons that public WarDriving databases have not been more popular.

In some embodiments of this invention: (1) Standardized hardware platform makes it easier to compare results from different vehicles; (2) Standardized data collection protocol enables arbitrarily complex methodology for obtaining raw data. With full control over the hardware and software platform, it is possible to implement a collection methodology that includes multiple data points per access point; (3) Data is still collected on a volunteer basis, but the driver does not need to do any special work or provide any supervision to collect the data. Information about WiFi access points is collected in the normal routine use of the OBD-II hardware; (4) Insofar as the OBD-II accessory provides a value to consumers, consumers have an incentive to install and maintain the device. This give the OBD-II hardware device potential to gain a sufficiently significant footprint to collect a critical mass of timely and accurate WiFi access points. Users are unlikely to purchase, install, and utilize the OBD-II accessory for its WarDriving capabilities. But they can nevertheless participate in this activity.

Thus, the present invention may be implemented in such a way that it can be used by a mass audience of WarDrivers. As a result, large number of users can now become WarDrivers simply with normal use of the OBD-II accessory. In these embodiments, no additional configuration or software/hardware installation is required to have the unit act as a data logger for WarDriving.

The present invention may be implemented in such a way that multiple drivers may record the same spot. This provides a means to calibrate between different hardware sensitivities and placements within the vehicle.

The present invention may be implemented in such a way that users are incented to modify their behavior in exchange for cash gift certificates, eligibility to win a prize, public recognition, or other consideration. For example, if a user was willing to drive slowly and/or drive along a certain route, they may enjoy compensation for this activity.

In addition to scanning for information about WiFi access points, the OBD-II hardware accessory of the present invention may, in some embodiments, be used as a platform for a variety of distributed mobile sensor networks, such as: (1) Scanning and logging other personal area wireless signals such as Bluetooth or Zigbee; (2) Scanning and logging fixed location wide-area transmitters and transceivers such as cellphone and pager towers, TV & radio towers, or transmitters used for two-way voice communication such as police, fire, or taxi; (3) Scanning any environmental factor that can be detected by the corresponding sensor. This includes temperature, humidity, barometric pressure, noise, vibration, radiation, or biological agents.

In some embodiments of this invention, this data can be uploaded to the server in both real-time and delayed. In embodiments that use cellphone networks for connectivity, some or all of the logged information can be uploaded in real-time. This allows time-critical and time-relevant applications such as traffic flow. In embodiments that use WiFi for connectivity, it may not be possible to upload data continuously in real-time.

In some embodiments of this invention, this sensor network can operate 24/7 while the vehicle is either operational (engine running) or dormant (engine off). While it may not make sense to continue to detect WiFi access points once the vehicle stops moving, sensors such as temperature continue to provide useful data.

In some embodiments of this invention, the OBD-II accessory has an advantage over a cellphone or other mobile connected device, in that the OBD-II accessory has far more electrical current available to continuously power a given sensor than does a cellphone or other portable device. A typical car battery stores much more power than a typical cellphone, and is constantly recharged while driving the vehicle. This enables power-hungry sensor applications both while the vehicle is operating and to a lesser extent, while the vehicle is dormant. A continuously operating GPS may drain a battery on a mobile cellphone too quickly. Therefore, applications running on mobile phones and similar battery-powered portable devices may not be able to take readings as often in order to conserve battery life.

Another advantage of the present invention is size. In some embodiments, the OBD-II accessory fits under the user's dashboard where adding a bulky sensor does not have the same negative visual impact as enlarging the physical size of a cellphone enclosure.

The examples in this disclosure may employ any variant of the OBD-II protocol. But this disclosure should be understood to include all future and past OBD implementations, versions, and sub-version that allow any wired and wireless external devices to monitor and interact with any vehicular on-board computer systems.

This invention is in no way limited to gasoline-powered cars. This invention is equally applicable to diesel, hybrid, electric only, or even mechanical (spinning flywheel) cars. In a more general sense, it is designed to help users conserve whatever finite energy source powers the vehicle—whether it is chemical, mechanical, electrical, or even human-powered. Additionally this power source can be local to the car or centrally sourced such as from overhead electrical wires used to power electric busses or trolleys found in many cities.

This invention may be implemented with user interfaces that employ English units popular in the United States of America. It is straightforward to convert to metric units common in the rest of the world. There is nothing about this invention that depends upon any particular system of units.

Furthermore, many aspects of this disclosure can be understood to additionally include data accumulated by means other than interfacing with the vehicle's on-board computer. For example, recording, logging, and uploading temperature data of the vehicle with a local temperature sensor is independent of the on-board computer.

The above disclosure refers in some cases to LCD displays. However, instead of LCD displays, other electronically controlled displays may be employed, such as Organic-LED or e-Paper (such as eInk). Alternately, information may be mechanically displayed by a motorized dial.

Wireless technologies used to implement this invention do not need to be RF-based. For example, IrDA based on modulation of infrared light. Acoustic modulation is another example of a non-RF wireless technology.

In some cases, this invention is implemented with RFID sensors, as discussed above. Alternately, other short-range low-power communication devices may be used.

In some instances, the same technology used for data communication with an access point can also be configured for the short-range communication requirements of this disclosure. For example, if power is lowered sufficiently, only tags very close to the access point will be detected.

In some implementations of this invention, a web page may be displayed that combines content from the Internet database, other Internet sources, as well as realtime data directly from the OBD hardware accessory. For example, the web page may use online gas prices to determine the real-time cost per hour of the current driving behavior, and use current weather conditions to compute head or tail wind.

For clarity's sake, here are a few definitions, in addition to those stated earlier:

"Hypermilers" means people who share information (e.g. by blogging or other Internet communications) about their car mileage and how to increase it.

"OBD" means onboard diagnostic.

As used herein, the term "web page" is not limited to a page displayed in a browser; it also includes information displayed on a screen in applications on smartphones, cellphones or other mobile devices. Thus, "web pages" may be viewed on a computer in the home, or on a portable computing device such a cellphone, while in a vehicle.

As used herein, "access point" means any wireless connection hub that mediates communication between a client and the Internet. The best-known type of access point is WiFi (802.11) but there are also access points that allow for Internet connectivity with WiMax (802.16), bluetooth, wireless USB, UWB, WiBro, Zigbee (802.15.4), 802.20, Z-Wave, DASH7, Insteon, IrDA, as well as proprietary and/or vendor-specific protocols. Cellphone towers can also considered access points for protocols such as CDMA, TDMA, GSM, and GPRS.

This invention may be implemented in many different ways. Here are a few examples:

This invention may be implemented as a method comprising the following steps, in combination: (a) accepting as inputs: vehicular data about the position and operation of a plurality of vehicles, location data relating to businesses or other points of interest within a specified geographic distance of at least one route traveled by at least one of said vehicles, and preference data indicating preferences of a plurality of users, respectively, (b) processing said vehicular, location and preference data, and (c) automatically outputting instructions for selectively sharing, in accordance with said user preferences, information comprising or derived at least in part from said vehicular data. Furthermore: (1) the vehicular data may include data gathered from a plurality of GPS devices installed on a plurality of vehicles, respectively; (2) the vehicular data may include data gathered from GPS devices and OBD devices installed on a plurality of vehicles; (3) the location data may include data regarding purchases made at specific locations; (4) the location data may include data regarding fees charged by a business at a particular location; (5) the location data may include data regarding tolls charged for travel between two locations on a particular route, (6) said processing may include associating GPS coordinates of a vehicle's position with said location data, (7) said processing may include the step of calculating fuel consumption based on said vehicular data, (8) said method may further comprise the step of outputting instructions for sending messages to drivers, which drivers or data associated with said drivers meet specified criteria, (9) the method may further comprise the steps of accepting, as input, data regarding how to categorize a trip or expense, or regarding rules for such categorization, and of outputting an expense report that breaks down expenses by categories; (10) said processing may include the step of determining at least one set of users who are associated with vehicles that travel on the same or similar routes; (11) said shared information may include aggregated or statistical data regarding a specific type of car; (12) the step of accepting inputted data may include accepting data inputted by a user regarding a vehicle's operation, maintenance or trips, or regarding expenses related to a vehicle's operation, maintenance or trips; (13) said preference data may indicate the preferences of said plurality of users, respectively, regarding how data may be shared with other specified users, classes of users or the public; (14) at least one of the preferences that a user may select may have the effect, if selected, that vehicular data associated with a particular vehicle or particular user is shared on a granular, and not merely an aggregated, basis, and (15) said processing may include ranking driving performance of a group of drivers according to a set of rules selected or specified by said group of drivers This invention may be implemented as a method comprising the following steps, in combination: (a) accepting as inputs: data about the position and operation of a plurality of vehicles, and data relating to businesses or other points of interest within a specified geographic distance of at least one route traveled by at least one of said vehicles, and (b) outputting signals for transmission directly or indirectly to a host server of a social network, wherein said signals are indicative of outputted data comprising or derived from all or some of said inputted data. Furthermore, said data about vehicular position and operation may comprise data gathered from GPS devices and OBD devices installed on a plurality of vehicles.

This invention may be implemented as apparatus comprising, in combination: (a) a GPS unit for gathering positional data about the position of a vehicle, (b) a processor for outputting data comprising or derived from said positional data, and (c) at least one wireless transmitter or transceiver for transmitting said outputted data directly or indirectly to a host server for processing said outputted data and selectively sharing on a public web interface information comprising or derived from said outputted data, in such a way that only some of the public logged in users of said web interface have access to said information. Furthermore, said apparatus may further comprise an OBD port for gathering operational data regarding the operation of a vehicle, in which case said outputted data may comprise or be derived from said operational data and said positional data.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method comprising the following steps, in combination:

obtaining:

vehicular data about the position and operation of a plurality of vehicles, location data relating to businesses or other points of interest within a specified geographic distance of at least one route traveled by at least one of said vehicles, and preference data indicating preferences of a plurality of users, respectively, processing said vehicular, location and preference data, and automatically outputting instructions for selectively sharing, in accordance with said user preferences, information comprising or derived at least in part from said vehicular data.

2. The method of claim 1, wherein the vehicular data includes data gathered from a plurality of GPS devices installed on a plurality of vehicles, respectively.

3. The method of claim 1, wherein the vehicular data includes data gathered from GPS devices and OBD devices installed on a plurality of vehicles.

4. The method of claim 1, wherein the location data includes data regarding purchases made at specific locations.

5. The method of claim 1, wherein the location data includes data regarding fees charged by a business at a particular location.

6. The method of claim 1, wherein the location data includes data regarding tolls charged for travel between two locations on a particular route.

7. The method of claim 1, wherein said processing includes associating GPS coordinates of a vehicle's position with said location data.

8. The method of claim 1, wherein said processing includes the step of calculating fuel consumption based on said vehicular data.

9. The method of claim 1, further comprising the step of outputting instructions for sending messages to drivers, which drivers or data associated with said drivers meet specified criteria.

10. The method of claim 1, further comprising the steps of obtaining data regarding how to categorize a trip or expense, or regarding rules for such categorization, and of outputting an expense report that breaks down expenses by categories.

11. The method of claim 1, wherein said processing includes the step of determining at least one set of users who are associated with vehicles that travel on the same or similar routes.

12. The method of claim 1, wherein said shared information may include aggregated or statistical data regarding a specific type of car.

13. The method of claim 1, wherein the step of obtaining data includes accepting data inputted by a user regarding a vehicle's operation, maintenance or trips, or regarding expenses related to a vehicle's operation, maintenance or trips.

14. The method of claim 1, wherein said preference data indicates the preferences of said plurality of users, respectively, regarding how data may be shared with other specified users, classes of users or the public.

15. The method of claim 14, wherein at least one of the preferences that a user may select has the effect, if selected, that vehicular data associated with a particular vehicle or particular user is shared on a granular, and not merely an aggregated, basis.

16. The method of claim 1, wherein said processing includes ranking driving performance of a group of drivers according to a set of rules selected or specified by said group of drivers.

17. A method comprising the following steps, in combination:

obtaining:

data about the position and operation of a plurality of vehicles, data relating to businesses or other points of interest within a specified geographic distance of at least one route traveled by at least one of said vehicles, and selectively outputting, in accordance with user preferences, signals for transmission directly or indirectly to a host server of a social network, wherein said signals are indicative of outputted data comprising or derived from all or some of said inputted data.

18. The method of claim 17, wherein said data about vehicular position and operation comprises data gathered from GPS devices and OBD devices installed on a plurality of vehicles.

19. Apparatus comprising, in combination:

a GPS unit for gathering positional data about the position of a vehicle, a processor for outputting data comprising or derived from said positional data, and at least one wireless transmitter or transceiver for transmitting said outputted data directly or indirectly to a host server for processing said outputted data and selectively sharing on a public web interface, and in accordance with user preferences, information comprising or derived from said outputted data, in such a way that only some of the public logged in users of said web interface have access to said information.

20. The apparatus of claim 19, further comprising an OBD port for gathering operational data regarding the operation of a vehicle, and wherein said outputted data comprises or is derived from said operational data and said positional data.

* * * * *